(12) United States Patent
Nakagawa et al.

(10) Patent No.: US 9,800,319 B2
(45) Date of Patent: Oct. 24, 2017

(54) RELAY APPARATUS

(71) Applicant: DENSO CORPORATION, Kariya, Aichi-pref. (JP)

(72) Inventors: Tetsuo Nakagawa, Nagoya (JP); Tomohisa Kishigami, Obu (JP)

(73) Assignee: DENSO CORPORATION, Kariya (JP)

( * ) Notice: Subject to any disclaimer, the term of this patent is extended or adjusted under 35 U.S.C. 154(b) by 13 days.

(21) Appl. No.: 14/821,879

(22) Filed: Aug. 10, 2015

(65) Prior Publication Data

US 2016/0065298 A1  Mar. 3, 2016

(30) Foreign Application Priority Data

Aug. 27, 2014 (JP) .................. 2014-173076

(51) Int. Cl.
*H04L 12/28* (2006.01)
*H04B 7/155* (2006.01)
*H04B 1/3822* (2015.01)

(52) U.S. Cl.
CPC ....... *H04B 7/15528* (2013.01); *H04B 1/3822* (2013.01); *H04B 7/15542* (2013.01)

(58) Field of Classification Search
CPC . H04L 47/10; H04L 2012/5631; H04L 47/15; H04L 47/2441; H04L 47/70; H04L 47/35; H04L 47/30; H04L 47/32; H04L 12/56; H04L 2012/56; H04W 80/04; H04W 8/26
USPC ....... 370/230, 235, 349, 389, 401, 402, 386, 370/396, 395.3, 395.52
See application file for complete search history.

(56) References Cited

U.S. PATENT DOCUMENTS

| 2011/0083161 A1* | 4/2011 | Ishida ............... H04L 12/40 726/2 |
| 2013/0159466 A1* | 6/2013 | Mao ................ H04L 67/12 709/218 |
| 2013/0304277 A1 | 11/2013 | Odate et al. |

FOREIGN PATENT DOCUMENTS

| JP | 2013-192090 A | 9/2013 |
| JP | 2013-193598 A | 9/2013 |

* cited by examiner

*Primary Examiner* — Brenda H Pham
(74) *Attorney, Agent, or Firm* — Posz Law Group, PLC

(57) ABSTRACT

A relay apparatus provided to a vehicle, performing first data communication with a first communication apparatus arranged outside the vehicle, and performing at least second data communication with multiple second communication apparatuses provided to the vehicle is provided. The relay apparatus includes a permission determination portion and an initiation switch portion. The permission determination portion determines whether first data communication between the first communication apparatus and a target second communication apparatus is permitted. The permission determination portion receives the first communication frame from the first communication apparatus through a connection switch portion determining a connection destination according to a control signal. The initiation switch portion outputs to the connection switch portion, the control signal designating the target second communication apparatus as the connection destination of the first communication apparatus.

11 Claims, 19 Drawing Sheets

FIG. 2A

| PORT SYMBOL | GROUP (VLAN) |
|---|---|
| 41a | OUTSIDE CONN GROUP |
| 41b | |
| 41c | IN-VEHICLE CONN GROUP |
| 41d | |
| 41e | |
| 41f | |

FIG. 2B

| PORT SYMBOL | GROUP (VLAN) |
|---|---|
| 41a | IN-VEHICLE CONN GROUP |
| 41b | OUTSIDE CONN GROUP |
| 41c | |
| 41d | IN-VEHICLE CONN GROUP |
| 41e | |
| 41f | |

FIG. 6

| AUTHORIZATION CODE | CONN PURPOSE CODE | PURPOSE |
|---|---|---|
| 1ST AUTHORIZATION CODE (□□□···) | 1ST PURPOSE CODE (△△△···) | FAILURE CODE READOUT |
| | 2ND PURPOSE CODE (△△△···) | OPERATION TEST |
| | 3RD PURPOSE CODE (△△△···) | PROGRAM WRITING |
| 2ND AUTHORIZATION CODE (□□□···) | 1ST PURPOSE CODE (△△△···) | FAILURE CODE READOUT |

FIG. 8

| ECU NAME | CONN PURPOSE CODE ENABLING TO HANDLE | CONN PURPOSE |
|---|---|---|
| ECU20a | 1ST PURPOSE CODE (△△△···) | FAILURE CODE READOUT |
| | 2ND PURPOSE CODE (△△△···) | OPERATION TEST |
| | 3RD PURPOSE CODE (△△△···) | PROGRAM WRITING |
| ECU20b | 1ST PURPOSE CODE (△△△···) | FAILURE CODE READOUT |
| ... | ... | ... |

RELAY APPARATUS

CROSS REFERENCE TO RELATED APPLICATION

This application is based on Japanese Patent Application No. 2014-173076 filed on Aug. 27, 2014, the disclosure of which is incorporated herein by reference.

TECHNICAL FIELD

The present disclosure relates to a technology by which communication is performed between a vehicle-outside apparatus and an onboard apparatus.

BACKGROUND

Patent literature 1: JP 2013-192090A

In order to improve a control of a vehicle and to enrich service in the vehicle, onboard apparatuses such as an electronic control unit (ECU) are mutually connected through a communication line, and a local area network (so-called, an in-vehicle LAN) is provided. The onboard apparatus share information. A certain communication protocol such as a controller area network (CAN), a local interconnect network (LIN), is often used in the in-vehicle LAN.

Communication is performed in a vehicle between the outside tool (also referred to as a vehicle-outside apparatus) and an onboard apparatus that is connected to the in-vehicle LAN. According to the technology, a diagnosis of a vehicle status or a rewriting processing of a program (a reprogramming) is performed. Patent literature 1 performs communication between the vehicle-outside apparatus and the onboard apparatus connected to the in-vehicle LAN through a relay apparatus mounted to a vehicle.

The inventors of the present application have found the following.

In a field of communication between the vehicle-outside apparatus and the onboard apparatus connected to the in-vehicle LAN, Ethernet (registered trademark) is becoming introduced. A communication speed of the Ethernet is faster than communication speed of CAN and LIN. For example, a relay apparatus is connected to a vehicle-outside apparatus through the Ethernet, receives a communication frame that is transmitted from the vehicle-outside apparatus, and transmits the received communication frame to an onboard apparatus that is also connected with the Ethernet. Incidentally, the vehicle-outside apparatus is an apparatus that is located outside the vehicle.

Between the vehicle-outside apparatus and the onboard apparatus, communication that should be performed only by an authorized operator is performed. For example, the communication that should be operated only by the authorized operator includes the rewriting processing of the program. Incidentally, the communication that should be operated only by the authorized operator may also be referred to as communication that should not be performed by a person (an unauthorized operator) other than an authorized operator. Thus, it may be preferred that the relay apparatus has a function preventing the communication with the vehicle-outside apparatus operated by the person other than the authorized person. Incidentally, the vehicle-outside apparatus operated by the person other than the authorized person may also be referred to as an unauthorized vehicle-outside apparatus.

When a processing load on the relay apparatus increases in order to provide the function preventing the communication with the unauthorized vehicle-outside apparatus, the communication speed between the vehicle-outside apparatus and the onboard apparatus may lower.

SUMMARY

It is an object of the present disclosure to provide a technology preventing a lowering of the communication speed in the communication between the vehicle-outside apparatus and the onboard apparatus.

Also, it is an object of the present disclosure to prevent the communication between the unauthorized vehicle-outside apparatus and the onboard apparatus.

According to one aspect of the present disclosure, a relay apparatus provided to a vehicle, performing first data communication with a first communication apparatus arranged outside the vehicle, and performing at least second data communication with multiple second communication apparatuses provided to the vehicle is provided. The first communication apparatus performs the first data communication, and the multiple second communication apparatuses perform the first data communication and the second data communication. The relay apparatus includes a permission determination portion and an initiation switch portion. The permission determination portion determines whether first data communication between the first communication apparatus and a target second communication apparatus is permitted on a basis of predetermined authorization information included in a first communication frame used in the first communication protocol. The permission determination portion receives the first communication frame from the first communication apparatus through a connection switch portion that is connected with the first communication apparatus and the multiple second communication apparatuses and determines a connection destination according to a control signal. The connection destination performs the first data communication with the first communication apparatus. The initiation switch portion outputs to the connection switch portion, the control signal designating the target second communication apparatus as the connection destination of the first communication apparatus when the permission determination portion permits the first data communication between the first communication apparatus and a target second communication apparatus. The first data communication is performed according to a first communication protocol. The second data communication is performed according to a second communication protocol. The multiple second communication apparatuses include the target second communication apparatus. The multiple second communication apparatuses perform the second data communication using a common communication channel in common with the multiple second communication apparatuses. A total amount of the first data communication per unit time is greater than a total amount of the second data communication per unit time.

According to this configuration, it may be possible to perform the data communication between the first communication apparatus and the second communication apparatuses to be a target without interposing the relay apparatus, when the communication between the first communication apparatus and the second communication apparatuses is permitted. Since the processing load on the relay apparatus is reduced, it may be possible to prevent a lowering of the communication speed of the data communication between the first communication apparatus and the target second communication apparatus.

According to the configuration, after the data communication between the first communication apparatus and the target second communication apparatus is once permitted, even when a certain unauthorized vehicle-outside vehicle apparatus is connected instead of the first communication apparatus, the unauthorized vehicle-outside vehicle apparatus does not perform the data communication with another second communication apparatus other than the target second communication apparatus. It may be possible to prevent communication with the unauthorized vehicle-outside vehicle apparatus.

BRIEF DESCRIPTION OF THE DRAWINGS

The above and other objects, features and advantages of the present disclosure will become more apparent from the following detailed description made with reference to the accompanying drawings. In the drawings:

FIG. 2A is a diagram illustrating a relationship between a port and a group that enables to perform data communication in a switching hub when the outside tool and a gateway ECU are communicable;

FIG. 2B is a diagram illustrating a relationship between the port and the group that enables to perform the data communication in the switching hub when the outside tool and a single ECU are connected;

FIG. 6 a diagram illustrating an example of a correspondence relationship between an authorization code and a connection purpose code;

FIG. 8 is a diagram illustrating an example of the connection purpose code that each ECU enables to handle;

DETAILED DESCRIPTION

Figure 1:
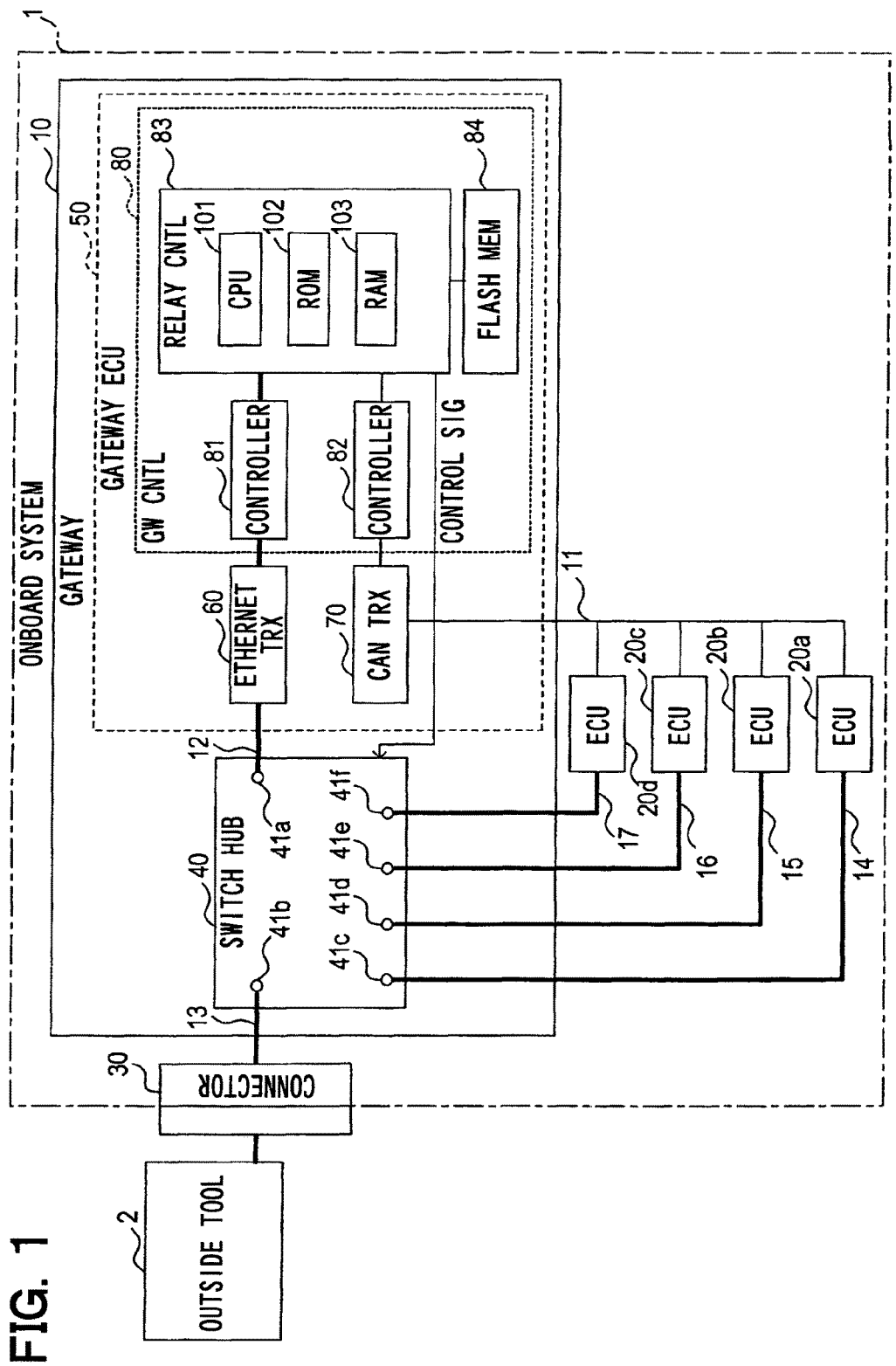
FIG. 1 is a block diagram illustrating a configuration of a communication system and an onboard system in a first embodiment.

Embodiments of the present disclosure as an example will be explained with referring to the drawings.

1. First Embodiment (1-1. Configuration)

A communication system described in FIG. 1 has an onboard system 1 mounted to a vehicle (also referred to as a subject vehicle) and the outside tool 2 (corresponding to the vehicle-outside apparatus) that is an apparatus located outside the subject vehicle.

The onboard system 1 has a connector 30 for connecting with the outside tool 2, a gateway apparatus 10, and multiple ECUs 20a, 20b, 20c, 20d. Incidentally, the gateway apparatus 10 is also referred to as a GW apparatus 10 for simplicity. The GW apparatus 10 has a switching hub 40 and a gateway ECU 50 as described in FIG. 1.

The gateway ECU 50 and the multiple ECUs 20a-20d are connected by a bus 11 that is a common communication channel and configure a network (referred to as an in-vehicle LAN). The gateway ECU 50 and the multiple ECUs 20a-20d transmit and receive data according to a CAN communication protocol (corresponding to a second communication protocol) through the bus 11. Hereinafter, a data communication according to the CAN communication protocol is referred to as a CAN communication (corresponding to a second data communication). Incidentally, regarding identical configurations such as the ECU 20a-20d, an alphabet symbol will be omitted such as ECU 20 except for a case when each configuration is explained separately.

The gateway ECU 50 is connected to the switching hub 40. The ECU 20 is also connected to the switching hub 40. The outside tool 2 is also connected to the switching hub 40. Thus, the gateway ECU 50, the ECU 20, and the outside tool 2 configure the network through the switching hub 40, so that the gateway ECU 50, the ECU 20, and the outside tool 2 transmit and receive data according to an Ethernet communication protocol (corresponding to a first communication protocol). Hereinafter, a data communication according to Ethernet communication protocol is referred to as an Ethernet communication (corresponding to a first data communication).

The switching hub 40 has two or more ports, and specifically, the switching hub 40 has ports 41a-41f, for example. The port 41a is connected with the gateway ECU 50 through a communication line 12. The port 41b is connected with the outside tool 2 through a communication line 13 and the connector 30. The ports 41c-41f are connected to the ECU 20a-20d through communication lines 14-17, respectively.

The switching hub 40 receives an Ethernet communication frame from a port 41. The switching hub 40 specifies a connection destination (that is, a port 41 other than the port 41 transmitting the Ethernet communication frame) to which an Ethernet communication frame is transmitted, based on identification information included in the received Ethernet communication frame. The switching hub 40 outputs the Ethernet communication frame to the specified port 41, which is an output destination. In order to specify the port 41 to be a destination of the Ethernet communication frame, a specifying circuit configured from an electronic circuit may be used, for example. The switching hub 40 relays the Ethernet communication frame.

Figure 5A:
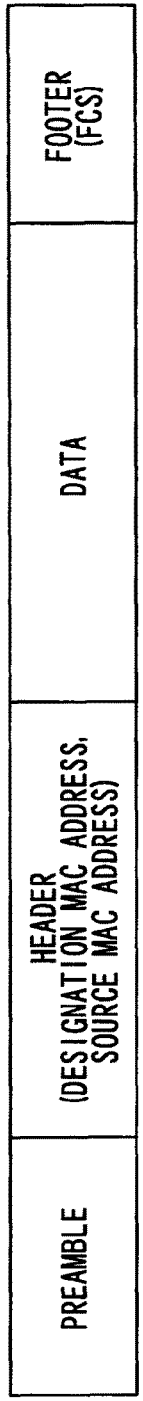
FIG. 5A is a diagram illustrating an example of a communication frame of Ethernet.
Figure 5B:
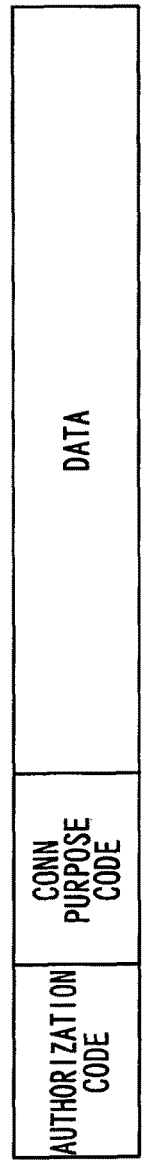
FIG. 5B is a diagram illustrating an example of a communication frame of the data part.

As an example in the present embodiment, the switching hub 40 uses a destination MAC address included in a header part in the Ethernet communication frame as identification information. Accordingly, the switching hub 40 specifies a connection destination, to which the Ethernet communication frame is transmitted. Incidentally, a configuration of the Ethernet communication frame is described in FIG. 5A and FIG. 5B.

Specifically, for example, when the port 41b receives the Ethernet communication frame including a MAC address of the ECU 20a as the destination MAC address, the switching hub 40 outputs the Ethernet communication frame to the port 41c, which is connected with the ECU 20a. Incidentally, the switching hub 40 has a learning function that learns a correspondence relation between a port 41 and a MAC address of a connection destination (a connection apparatus), which is connected with the port 41. Since the learning function is a known function, an explanation will be omitted.

The switching hub 40 has a function referred to as a VLAN function. According to this function, on the basis of a table that groups the multiple ports 41, the switching hub 40 enables to relay the Ethernet communication frame among the ports 41 that belong to the identical group, and disables the relay of the Ethernet communication frame among the ports 41 that belong to different groups.

For example, according to a table described in FIG. 2A, the port 41a and the port 41b belong to the identical group, that is, the vehicle-outside connection group. The ports 41c-41f belong to an in-vehicle connection group, which is different from the vehicle-outside connection group. In this example, the outside tool 2 connected with the port 41b enables to perform the Ethernet communication only with the gateway ECU 50, which is connected with the port 41a. The outside tool 2 cannot perform the Ethernet communication with the ECUs 20a-20d, which are connected with the ports 41c-41f belonging to the in-vehicle connection group.

For example, according to a table described in FIG. 2B, the port 41b and the port 41c belong to the identical vehicle-outside connection group. The ports 41a, 41d-41f belong to an in-vehicle connection group, which is different from the vehicle-outside connection group. In this case, the outside tool 2 connected with the port 41b enables to perform the Ethernet communication only with the ECU 20a connected with the port 41c. The outside tool 2 cannot perform the Ethernet communication with the gateway ECU 50, the ECUs 20b-20d, which are connected with the ports 41a, 41d-41f that belong to the in-vehicle connection group.

Therefore, in the switching hub 40 in the present embodiment, a combination of the port 41 enabling to perform data communication, that is, a connection destination enabling to perform the data communication is set by a control signal that is output from the gateway ECU 50. In other words, the gateway ECU 50 outputs the control signal to the switching hub 40. According to the control signal, the combination of ports 41 that enables to perform the data communication is determined. Incidentally, except a case when the GW connection processing (S250) is performed, the outside tool 2 connected with the port 41b is set by the control signal as a usual status, so that the outside tool 2 is connected only with the gateway ECU 50 connected with the port 41a and perform the Ethernet communication with the gateway ECU 50 (with referring to FIG. 2A).

Referring again to FIG. 1, the gateway ECU 50 has an Ethernet transceiver 60, a CAN transceiver 70, and a gateway control portion 80. Hereinafter, the gateway control portion 80 is referred to as the GW control portion 80.

The Ethernet transceiver 60 is connected to the port 41a in the switching hub 40 through the communication line 12. The Ethernet transceiver 60 corresponds to an interface for performing the Ethernet communication with other communication devices that are connected through switching hub 40. Other communication apparatus includes the outside tool 2 and each ECU 20.

The CAN transceiver 70 corresponds to an interface for performing the CAN communication with other communication apparatus connected through the bus 11. Other communication apparatus includes each ECU 20.

The GW control portion 80 has an Ethernet controller 81, a CAN controller 82, a relay control portion 83, and a flash memory 84.

The Ethernet controller 81 corresponds to hardware that is connected with the Ethernet transceiver 60 and executes communication between other communication apparatuses on the basis of the Ethernet communication protocol.

The CAN controller 82 corresponds to hardware that is connected with the CAN transceiver 70 and executes communication between other communication apparatuses on the basis of the CAN communication protocol.

The relay control portion 83 has a known microprocessor having a CPU 101, a ROM 102, and a RAM 103. The relay control portion 83 (the CPU 101) performs various functions according to a program stored in the ROM 102 or the flash memory 84. For example, the relay control portion 83 outputs the control signal, so that the relay control portion 83 sets the switching hub 40. For example, the relay control portion 83 performs a relay processing, so that the relay control portion 83 controls communication between the outside tool 2 and the ECU 20.

The flash memory 84 is a nonvolatile recording device that can rewrite a record content electrically, and stores various programs executed by the relay control portion 83 (the CPU 101), an authorization code, and a connection purpose code in advance.

Figure 3A:
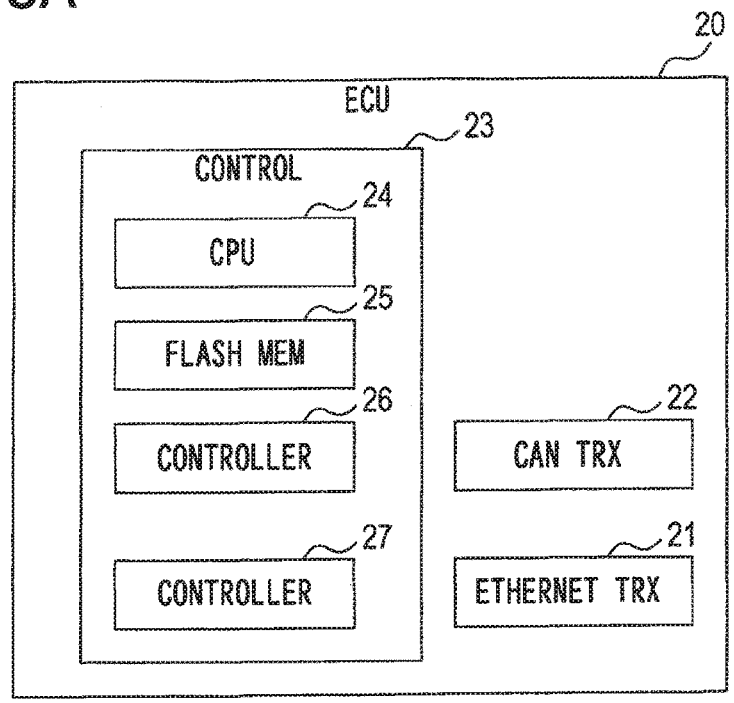
FIG. 3A is a block diagram illustrating a configuration of a ECU.

Each ECU 20 has an Ethernet transceiver 21, a CAN transceiver 22, and a control portion 23 as illustrated in FIG. 3A, for an example. The control portion 23 has a CPU 24, a flash memory 25, a CAN controller 26, and an Ethernet controller 27. The CPU 24 performs various functions according to a program stored in the flash memory 25. The flash memory 25 stores these programs, an authorization code, and a connection purpose code in advance. The Ethernet transceiver 21 corresponds to an interface for performing the Ethernet communication with the outside tool 2 through the switching hub 40. The CAN transceiver 22 corresponds to an interface for performing the CAN communication with the gateway ECU 50 and other ECU 20 through the bus 11.

Figure 3B:
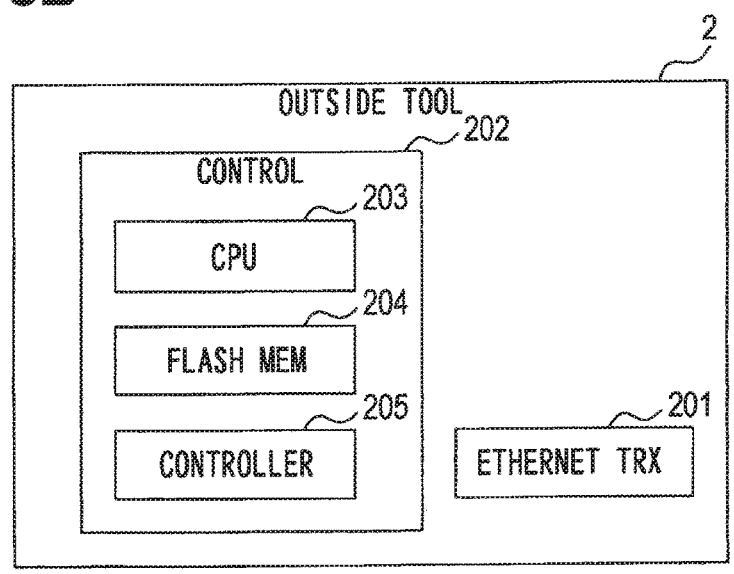
FIG. 3B is a block diagram illustrating a configuration of the outside tool.

The outside tool 2 has an Ethernet transceiver 201 and a control portion 202 as described in FIG. 3B, for example. The control portion 202 has a CPU 203, a flash memory 204, and an Ethernet controller 205. While the outside tool 2 (the CPU 203) is connected to the onboard system 1 through the connector 30, the outside tool 2 performs the Ethernet communication with the ECU 20 or the gateway ECU 50 through the switching hub 40. The outside tool 2 (the CPU 203) performs, for an example, a diagnosis of a vehicle status, a setting and release of data (security related information or the like), and rewriting processing of a program stored in the gateway ECU 50 or the ECU 20 through the Ethernet communication. The flash memory 25 stores the programs for executing the processing in the CPU 203, an authorization code, and a connection purpose code, in advance. Incidentally, the outside tool 2 may be configured with a universal personal computer, a smartphone (a multi-functional portable phone), or the like.

Incidentally, in the present embodiment, the onboard system 1 is supplied with electric power even when an ignition switch in a vehicle is in an off status. Thus, the gateway ECU 50 and the each ECU 20 execute the GW connection processing and the ECU connection processing, respectively.

(1-2. Processing)

Processing (a communication method) executed by the communication system in the present embodiment will be explained.

(1-2-1. Processing by Outside Tool)

Figure 4:
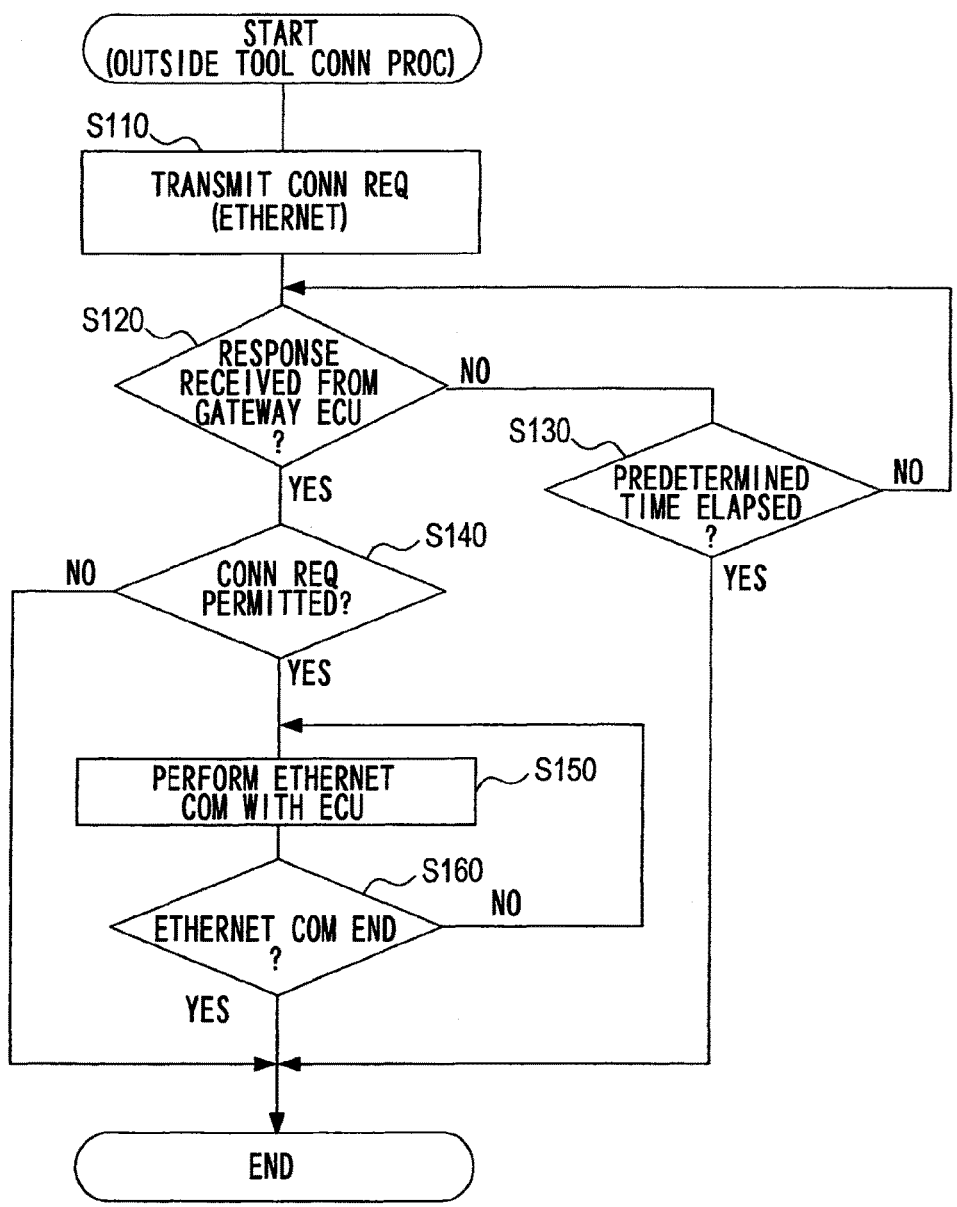
FIG. 4 is a flowchart of the outside tool connection process executed by the outside tool.

The outside tool connection processing will be explained with referring to a flowchart in FIG. 4. The control portion 202 in the outside tool 2 performs the outside tool connection processing.

The control portion 202 (the CPU 203) transmits a connection request with an ECU 20 to be a communication target to the gateway ECU 50 by the Ethernet communication (S110). Incidentally, an ECU to be a communication target may also be referred to as a target ECU.

The CPU 203 transmits an Ethernet communication frame. As described in FIG. 5A and FIG. 5B, the Ethernet communication frame has a preamble part, a header part, a data part, and a footer part, for example. The header part has a destination MAC address, a transmission source MAC address, or the like. The footer part has a frame check sequence (FCS). Incidentally, the destination MAC address in the Ethernet communication frame transmitted by the CPU at S110 corresponds to a MAC address of an ECU 20 (a target ECU 20) to be the communication target. The source MAC address corresponds to a MAC address of the outside tool 2. The data part has the authorization code and the connection purpose code.

The authorization code corresponds to a predetermined code showing that the Ethernet communication frame including the authorization code has been transmitted from the outside tool 2 which an authorized operator operates. The connection purpose code corresponds to a predetermined code showing an purpose (or an object) of the Ethernet communication between the outside tool 2 and the ECU 20 to be the communication target, the outside tool 2 being a transmission source of the Ethernet communication frame including the connection purpose code.

For example, as described in FIG. 6, a correspondence relation is predetermined between the authorization code and the connection purpose code. That is, one or more of the connection purpose codes are predetermined for one authorization code. The flash memory 204 stores the authorization code, the connection purpose code, and the correspondence relation, as a table.

For example, when the outside tool 2 performs the Ethernet communication with the ECU 20 in order to read a failure code of the ECU 20 to be the communication target, the CPU 203 sets a first purpose code showing a readout of the failure code as the connection purpose code, and transmits the Ethernet communication frame having the authorization code that is either of the first authorization code and the second authorization code corresponding to the first purpose code. Incidentally, the CPU 203 in the present embodiment provides all Ethernet communication frame to be transmitted with the authorization code and the connection purpose code. All Ethernet communication frame to be transmitted include the authorization code and the connection purpose code.

Referring again to FIG. 4, the CPU 203 determines whether the CPU 203 receives a response from the gateway ECU 50 by using the Ethernet communication (S120). When the CPU 203 has received the response from the gateway ECU 50, the processing shifts to S140. When the CPU 203 does not receive the response, the processing shifts to S130.

At S130, the CPU 203 determines whether a predetermined time has elapsed. Before the predetermined time has elapsed (S130: NO), the CPU 203 returns the processing to S120. When the predetermined time has elapsed (S130: YES), the CPU 203 ends the outside tool connection processing.

As described above, when there is the response from the gateway ECU 50 by using the Ethernet communication, the processing shifts to S140. At S140, the CPU 203 determines whether the connection request with the ECU 20 to be the communication target is permitted on the basis of the Ethernet communication frame that is transmitted from the gateway ECU 50. When it is determined that the connection request with the ECU 20 to be the communication target is permitted, the CPU 203 shifts the processing to S150. When it is not determined that the connection request is permitted (that is, it is determined as a non-permission), the outside tool connection processing is terminated.

At S150 to which the processing shifts when the connection request with the ECU 20 to be the communication target is permitted, before it is determined that the Ethernet communication ends (S160: NO), the CPU 203 continues the Ethernet communication with the ECU 20 to be the communication target. When it is determined that the Ethernet communication ends (S160: YES), the CPU 203 ends the outside tool connection processing. As an example, the CPU 203 determines that the Ethernet communication with the ECU 20 to be the communication target ends when either of the following termination conditions (1), (2) is satisfied:

(1) a case when all data to be transmitted have been transmitted to the ECU 20 to be the communication target;

(2) a case when the CPU 203 receives a notice (a non-permission notification) that a connection with the ECU 20 to be the communication target is not permitted from the gateway ECU 50 by using the Ethernet communication.

(1-2-2. Processing by Gateway ECU)

Figure 7:
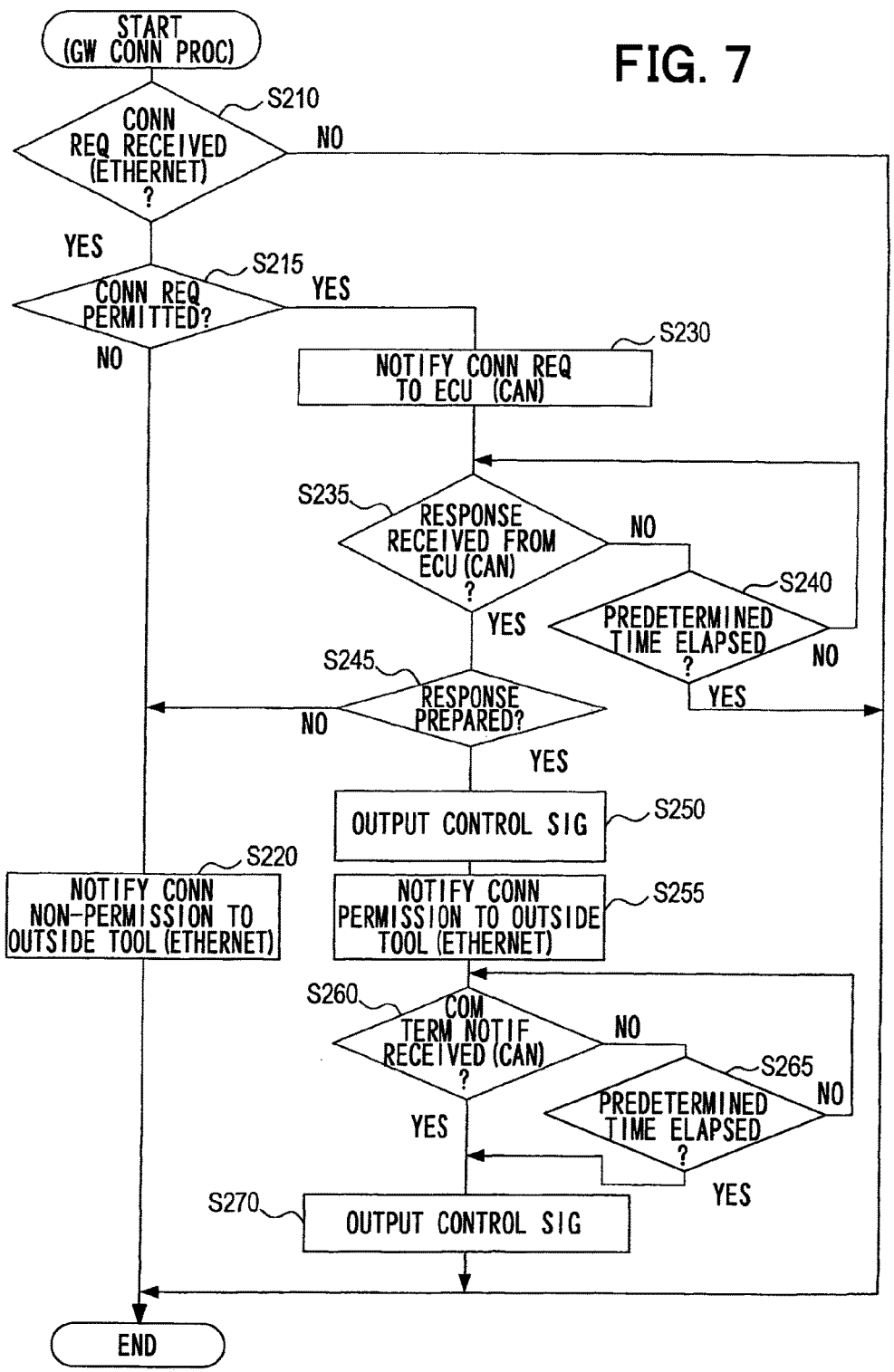
FIG. 7 is a flowchart of a gateway connection processing executed by a gateway ECU.

The relay control portion 83 (the CPU 101) in the gateway ECU 50 executes gateway connection processing (hereinafter, referred to as GW connection processing). The GW connection processing will be explained with referring to a flowchart in FIG. 7.

The relay control portion 83 determines whether the relay control portion 83 receives a connection request with the ECU 20 to be the communication target from the outside tool 2 by using the Ethernet communication (S210). When it is determined that the connection request is not received, the relay control portion 83 ends the GW connection processing. When it is determined that the connection request is received, the relay control portion 83 shifts the processing to S215.

At S215, the relay control portion 83 determines whether the connection request is permitted on the basis of the authorization code and the connection purpose code included in the Ethernet communication frame received at S210. That is, the relay control portion 83 determines whether a connection between the outside tool 2 and the ECU 20 to be the communication target by using the Ethernet communication is permitted. When the received Ethernet communication frame is the Ethernet communication frame that has transmitted from the outside tool 2 operated by the authorized operator, the Ethernet communication between the ECU 20 to be the communication target and the outside tool 2 is permitted.

For example, the relay control portion 83 determines that the received Ethernet communication frame has been transmitted from the outside tool 2 operated by the authorized operator, when all of the following permission conditions are satisfied:

(1) a case where the authorization code included in the received Ethernet communication frame coincides with an authorization code stored in advance in the flash memory 84;

(2) a case where a correspondence relation between the authorization code and the connection purpose code included in the received Ethernet communication frame coincides with a correspondence relation between the authorization code and the connection purpose code stored in advance in the flash memory 84; and (3) a case where the connection purpose code included in the received Ethernet communication frame is a connection purpose code that the ECU 20 to be the communication target enables to handle.

Incidentally, the connection purpose code showing a connection purpose that each ECU 20 enables to handle is determined in advance, as described in FIG. 8. The connection purpose code showing the connection purpose that each ECU 20 enables to handle is a connection purpose code that illustrates a function of each ECU 20. As described in FIG. 8, one or more of the connection purpose codes is predetermined for each ECU 20. Incidentally, the correspondence relation is stored in advance in the flash memory 84 as a table.

For example, as described in FIG. 8, the ECU 20a enables to handle a connection purpose such as a failure code readout, an operation test, a program writing. For example, when the received Ethernet communication frame is directed to the ECU 20a as the communication target, and when the first purpose code is set as the connection purpose code in the Ethernet communication frame, the relay control portion 83 determines that the connection purpose code is a connection purpose code that the ECU 20 (in this case, the ECU 20a) to be the communication target that enables to handle. Incidentally, in the present embodiment, the data part in the received Ethernet communication frame includes data showing which ECU 20 is a communication target by the received Ethernet communication frame. The relay control portion 83 specifies the ECU 20 to be the communication target on the basis of the data.

Referring again to FIG. 7, the processing performed by the GW ECU 50 will be explained. At S215, when it is determined that the received Ethernet communication frame is not transmitted from the outside tool 2 operated by the authorized operator, the relay control portion 83 shifts the processing to S220. When the connection request with the ECU 20 to be the communication target through the outside tool 2 is not permitted, the relay control portion 83 shifts the processing to S220. By contrast, when it is determined that the received Ethernet communication frame has been transmitted from the outside tool 2 operated by the authorized operator, the relay control portion 83 shifts the processing to S230. That is, when the connection request with the ECU to be the communication target through the outside tool 2 is permitted, the relay control portion 83 shifts the processing to S230.

Figure 9A:
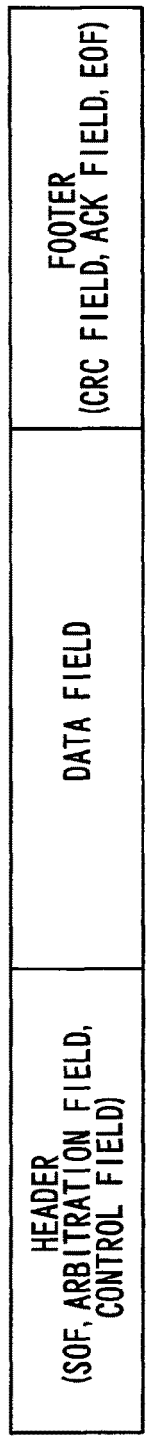
FIG. 9A is a diagram illustrating an example of a CAN communication frame.
Figure 9B:
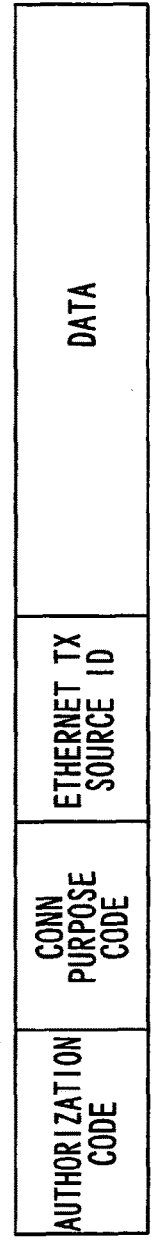
FIG. 9B is a diagram illustrating an example of a data field in the CAN communication frame.

At S230, the relay control portion 83 informs the ECU 20 to be the communication target that the connection request is received from the outside tool 2, by using the CAN communication. Incidentally, the CAN communication frame transmitted by the relay control portion 83 includes the header part, the data part, and the footer part, as described in FIG. 9A and FIG. 9B, for example. The header part includes a SOF (a start of frame), an arbitration field, or the like. The footer part includes a CRC (a cyclic redundancy check) field, an EOF (an end of file), or the like. The data part includes the authorization code, the connection purpose code, and the Ethernet transmission source ID. The authorization code and the connection purpose code are included in the Ethernet communication frame, which is received at S210. The Ethernet transmission source ID is used in order to identify a transmission source of the Ethernet communication frame. In the present embodiment, the transmission source MAC address included in the Ethernet communication frame received at S210 is defined as the Ethernet transmission source ID.

When there is the connection request transmitted from the outside tool 2, the relay control portion 83 determines whether the ECU 20 to be the communication target transmits the response to the relay control portion 83 by using the CAN communication (S235). When the relay control portion 83 receives the response from the ECU 20 to be the communication target by using the CAN communication, the relay control portion 83 shifts the processing to S245. When there is not the response, the relay control portion shifts the processing to S240.

Before a predetermined time has elapsed at S240 (S240: NO), the relay control portion 83 returns the processing to S235. When the predetermined time has elapsed (S240: YES), the relay control portion 83 ends the GW connection processing.

At S245, it is determined whether the response from the ECU 20 to be the communication target at S230 shows a completion of preparation to perform the Ethernet communication with the outside tool 2. When the response shows the completion of the preparation, the relay control portion 83 shifts the processing to S250. When the response does not show the completion of the preparation, the relay control portion 83 shifts the processing to S220.

At S220, the relay control portion 83 informs the outside tool 2 that a connection with the ECU 20 to be the communication target is not permitted by using the Ethernet communication. In other words, the relay control portion 83 informs the outside tool 2 of a non-permission of the connection. Then, the relay control portion 83 ends the GW connection processing.

When the response from the ECU 20 to be communication target shows the preparation of the Ethernet communication with the outside tool 2 has been completed, the processing shifts to S250. At S250, the relay control portion 83 outputs a control signal that groups the ports 41 in the switching hub 40, so that only the ECU 20 to be the communication target enables to perform data communication with the outside tool 2. For example, when the ECU 20a corresponds to the communication target (that is, when the ECU 20 to be the communication target is the ECU 20a), the relay control portion 83 outputs the control signal that sets a grouping of the port 41 in the switching hub 40 as described in FIG. 2B, so that only the ECU 20a enables to perform the data communication with the outside tool 2.

At S255, the relay control portion 83 informs the outside tool 2 that a connection request with the ECU 20 to be the communication target is permitted by using the Ethernet communication.

The relay control portion 83 determines whether the relay control portion 83 receives a communication termination notification from the ECU 20 to be the communication target by using the CAN communication (S260). Incidentally, the communication termination notification shows that the Ethernet communication with the outside tool 2 has been terminated. When the relay control portion 83 does not receive the communication termination notification from the ECU 20 to be the communication target, the relay control portion 83 waits until a predetermined time has elapsed (S265: NO). When the predetermined time elapses (S265: YES), the relay control portion 83 ends the GW connection processing. Incidentally, the predetermined time is a period of time longer than a maximum value of a period of time when the Ethernet communication is executed between the outside tool 2 and the ECU 20 to be the communication target. When the relay control portion 83 receives the communication termination notification from the ECU 20 to be the communication target (S260: YES), the relay control portion 83 shifts the processing to S270.

At S270, so that only the gateway ECU 50 enables to perform the Ethernet communication with the outside tool 2, as described in FIG. 2A, the relay control portion 83 outputs the control signal that groups the ports 41 in the switching hub 40. That is, the relay control portion 83 releases the connection between the outside tool 2 and the ECU 20 to be communication target. The relay control portion 83 ends the GW connection processing.

(1-2-3. Processing by ECU)

Figure 10:
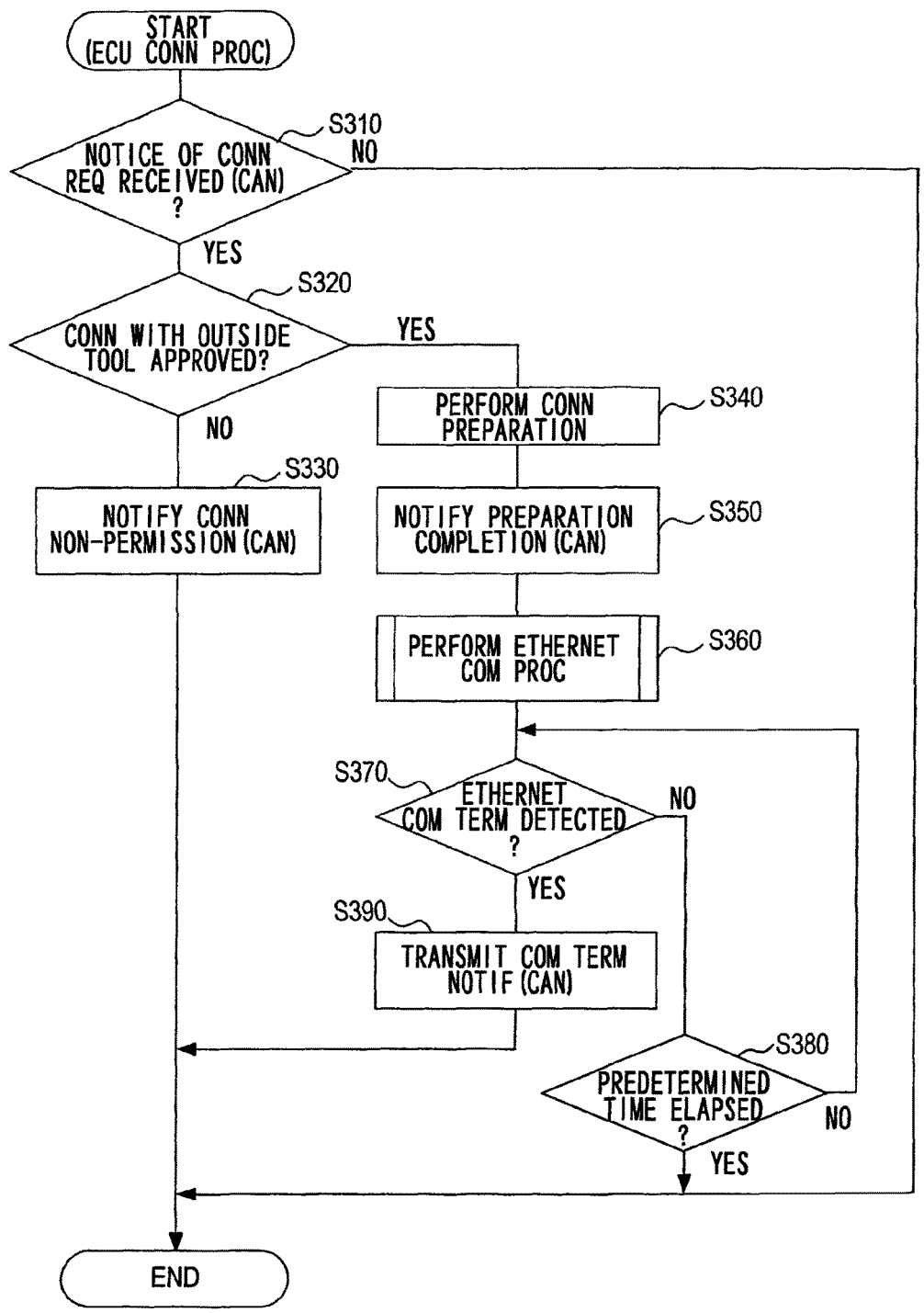
FIG. 10 is a flowchart of ECU connection processing executed by an ECU.

The control portion 23 (the CPU 24) in each ECU 20 executes the ECU connection processing. The ECU connection processing will be explained with referring to a flowchart in FIG. 10.

The CPU 24 determines whether the CPU 24 receives a notification showing the connection request of the outside tool 2 from the gateway ECU 50 by using the CAN communication (S310). When the CPU 24 does not receive the connection request of the outside tool 2, the CPU ends the ECU connection processing. When the CPU 24 receives the connection request, the CPU 24 shifts the processing to S320.

At S320, the CPU 24 determines whether the connection request of the outside tool 2 is approved. When a predetermined approval condition is satisfied, the CPU 24 approves the connection request of the outside tool 2. For example, the predetermined approval condition includes a case when the connection purpose code included in the CAN communication frame received at S310 corresponds to the connection purpose code that an ECU 20 enables to handle.

Each ECU 20 stores in advance the connection purpose code that each ECU 20 enables to handle in the flash memory 25. When the received connection purpose code corresponds to the connection purpose code that the ECU 20 itself enables to handle, the CPU 24 shifts the processing to S340. When the received connection purpose code does not correspond to the connection purpose code that the ECU 20 itself enables to handle, the CPU 24 notifies the gateway ECU 50 that the connection request of the outside tool 2 is not permitted (a connection non-permission) by using the CAN communication (S330). The CPU 24 ends the ECU connection processing.

At S340 to which the processing shifts when there is the connection request from the outside tool 2, the CPU 24 prepares to start the Ethernet communication with the outside tool 2.

The CPU 24 notifies the gateway ECU 50 that a preparation to start the Ethernet communication with the outside tool 2 is completed by using the CAN communication (S350). Incidentally, the outside tool 2 corresponds to a transmission source having the Ethernet transmission source ID.

The CPU 24 executes the Ethernet communication processing that performs the Ethernet communication with the outside tool 2.

The CPU 24 determines whether the CPU 24 detects a termination of the Ethernet communication (S370). For example, when a termination flag is set, it is determined that the Ethernet communication ends. When the CPU 24 does not detect the termination of the Ethernet communication (S370: NO), the CPU 24 shifts the processing to S380. When the CPU 24 detects the termination of the Ethernet communication (S370: YES), the CPU 24 shifts the processing to S390.

Before a predetermined time has elapsed at S380 (S380: NO), the CPU 24 returns the processing to S370. When the predetermined time has elapsed (S370: YES), the CPU 24 ends the GW connection processing.

At S390, the CPU 24 transmits the communication termination notification, which shows the Ethernet communication is completed, to the gateway ECU 50 by using the CAN communication. The CPU 24 ends the ECU connection processing.

Figure 11:
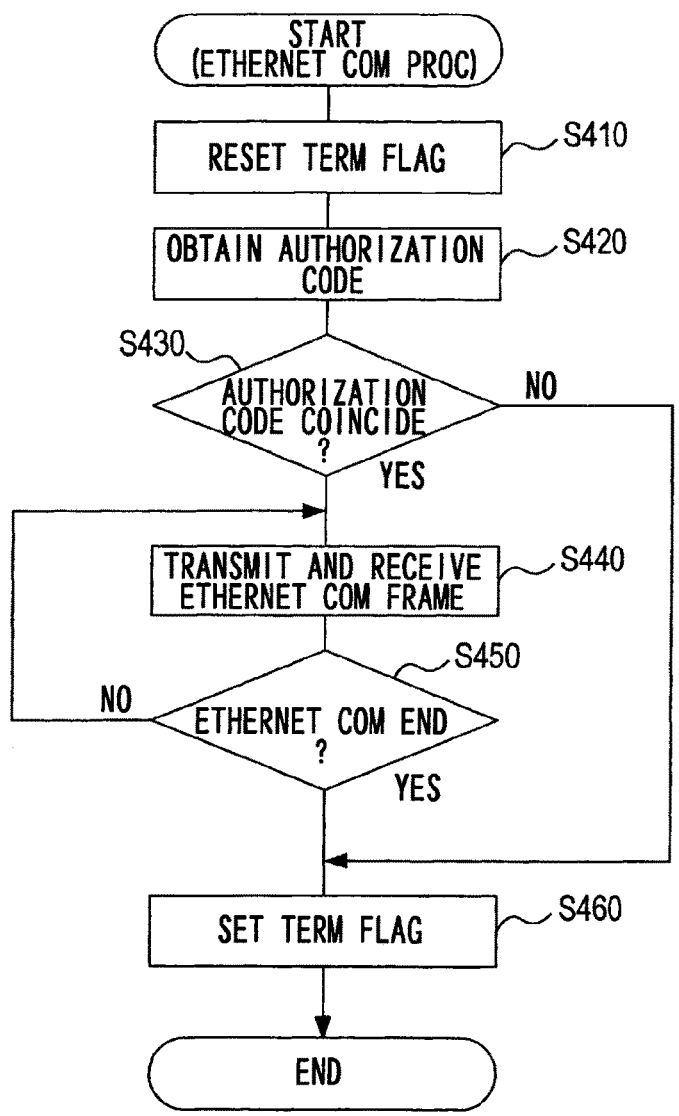
FIG. 11 is a flowchart of Ethernet communication processing executed by an ECU.

The Ethernet communication processing executed at S360 of the ECU connection processing will be explained with referring to the flowchart of FIG. 11.

The CPU 24 resets the termination flag (S410). The termination flag indicates whether the Ethernet communication is completed.

The CPU 24 obtains the authorization code included in the CAN communication frame received at S310 (S420).

The CPU 24 determines whether the authorization code obtained at S420 coincides with the authorization code stored in advance in the flash memory 25 (S430). When the CPU 24 does not coincide with the authorization code, the CPU 24 shifts the processing to S460. When the authorization code coincides with the authorization code, the CPU 24 shifts the processing to S440.

At S440, the CPU 24 performs a transmission and reception of the Ethernet communication frame with the outside tool 2.

The CPU 24 determines whether the Ethernet communication has been completed, that is, whether all the Ethernet communication frames transmitted from the transmission source has been received (S450). When the Ethernet communication does not terminate, the CPU 24 returns the processing to S440, so that the CPU 24 continues the Ethernet communication with the outside tool 2. When the Ethernet communication ends, the CPU 24 shifts the processing to S460.

At S460, the CPU 24 sets the termination flag and ends the Ethernet communication processing.

(1-3. Operation)

Operation of the onboard system 1 will be explained with referring to sequences in FIG. 12 and FIG. 13.

Figure 12:
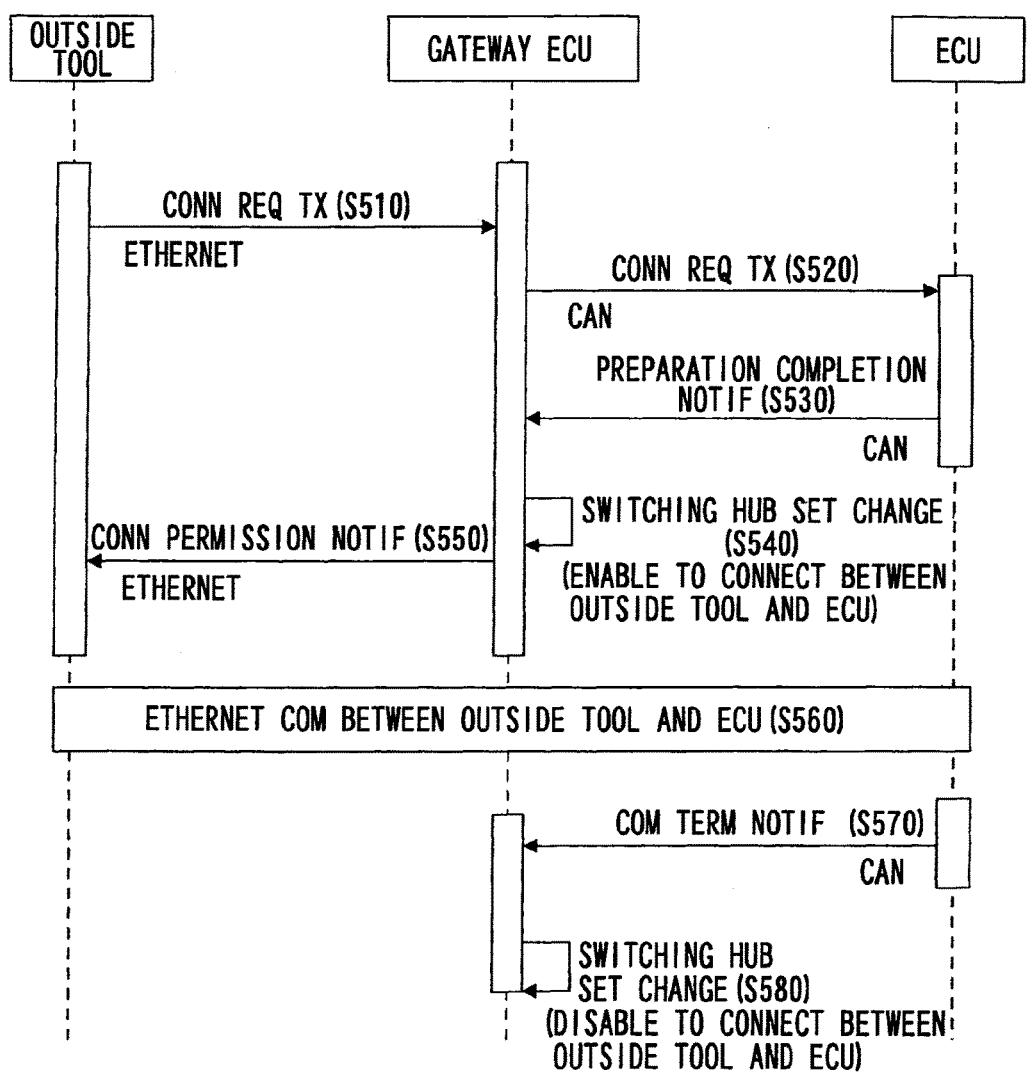
FIG. 12 is a diagram illustrating an example of a sequence when a connection of the outside tool and an ECU is permitted.

FIG. 12 is a diagram illustrating an example of a sequence when a connection between the outside tool 2 and the ECU 20 to be the communication target is permitted.

The outside tool 2 transmits the connection request with the ECU 20 to be the communication target by using the Ethernet communication (S510). In the present embodiment, as the normal setting (a default setting), the grouping of the port 41 in the switching hub 40 is set up, so that only the gateway ECU 50 enables to perform the data communication with the outside tool 2. Thus, the Ethernet communication frame, which the outside tool 2 has transmitted, is transmitted to the gateway ECU 50 through the switching hub 40.

The gateway ECU 50, which has received the Ethernet communication frame through the switching hub 40, performs the following determination on the basis of the authorization code and the connection purpose code included in the received Ethernet communication frame. When the connection request with the ECU 20 to be the communication target and the outside tool 2 is permitted (S215: YES), the gateway ECU 50 transmits the connection request of the outside tool 2 to the ECU 20 to be the communication target by using the CAN communication (S520).

When the connection purpose code included in the received CAN communication frame corresponds to the connection purpose code that an ECU 20 enables to handle (S320: YES), the ECU 20 to be the communication target prepares to perform the Ethernet communication (S340). The ECU 20 to be the communication target transmits the notification of preparation completion to the gateway ECU 50 (S530).

When the gateway ECU 50 receives the notification of the completion of the preparation from the ECU 20 to be the communication target by using the CAN communication (S245: YES), the gateway ECU 50 outputs the control signal that sets the grouping of the port 41 in the switching hub 40 (S540). Therefore, only the ECU 20 to be the communication target enables to perform the data communication with the outside tool 2. Accordingly, the ECU 20 to be the communication target and the outside tool 2 enable to perform the Ethernet communication.

The gateway ECU 50 transmits to the outside tool 2, the connection permission notification with the ECU 20 to be the communication target by using the Ethernet communication (S550).

After S550, the Ethernet communication is performed between the ECU 20 to be the communication target and the outside tool 2 (S560).

When the outside tool 2 and the ECU 20 to be the communication target end the Ethernet communication, the ECU 20 to be the communication target transmits the communication termination notification to the gateway ECU 50 by using the CAN communication (S570).

When the gateway ECU 50 receives the communication termination notification from the ECU 20 to be communication target by using the CAN communication, the gateway ECU 50 outputs the control signal that sets grouping of the port 41 in the switching hub 40. Therefore, only the gateway ECU 50 enables to perform the communication with the outside tool 2 (S580). Accordingly, the communication between the ECU 20 to be the communication target and the outside tool 2 is disabled.

Figure 13:
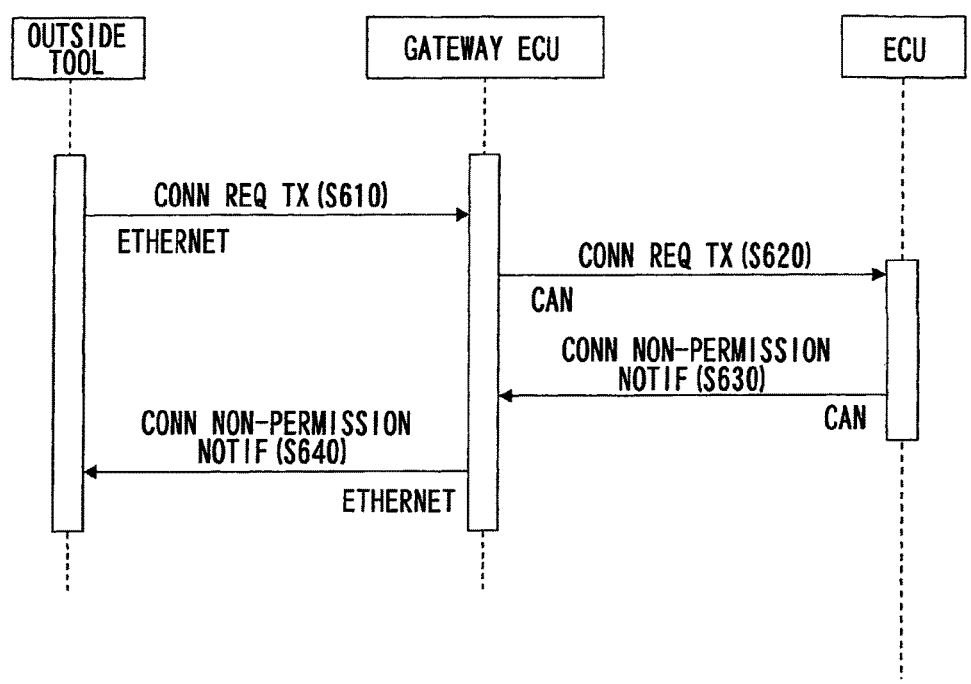
FIG. 13 is a diagram illustrating an example of a sequence when a connection of the outside tool and an ECU is not permitted.

FIG. 13 is a diagram illustrating an example of a sequence when a connection between the outside tool 2 and the ECU 20 to be the communication target is not permitted.

The outside tool 2 transmits the connection request with the ECU 20 to be the communication target by using the Ethernet communication (S610).

The gateway ECU 50, which has received the Ethernet communication frame through the switching hub 40, performs the following determination on the basis of the authorization code and the connection purpose code included in the received Ethernet communication frame. When the connection request with the ECU 20 to be the communication target and the outside tool 2 is permitted (S215: YES), the gateway ECU 50 transmits the connection request of the outside tool 2 to the ECU 20 to be the communication target by using the CAN communication (S620).

When the connection purpose code included in the received CAN communication frame does not correspond to the connection purpose code that an ECU 20 enables to handle (S320: NO), the ECU 20 to be the communication target notifies the gateway ECU 50 that the connection with the outside tool 2 is not permitted, by using the CAN communication (S630).

The gateway ECU 50 notifies the outside tool 2 that the connection with the ECU 20 to be the communication target is not permitted, by using the Ethernet communication (S640).

(1-4. Effect)

According to the first embodiment, the following technical effects are obtained, for example.

(1A) According to the first embodiment, on the basis of authorization information included in the Ethernet communication frame received from the outside tool 2 through the switching hub 40, the gateway ECU 50 outputs the control signal that determines the ECU 20 to be the communication target as a connection destination of the outside tool 2 when the data communication between the outside tool 2 and the ECU 20 to be the communication target is permitted. Incidentally, the authorization information includes the authorization code, the connection purpose code, and a correspondence relation of them. Accordingly, after the communication between the outside tool 2 and the ECU 20 to be the communication target is permitted, without interposing the gateway ECU 50, the data communication is performed by the Ethernet communication between the outside tool 2 and the ECU 20 to be the communication target. Therefore, since it may be possible to reduce the processing load on the gateway ECU 50, it may be possible to prevent a lowering of the communication speed of the Ethernet communication between the ECU 20 to be the communication target and the outside tool 2.

When the communication between the outside tool 2 and the ECU 20 to be the communication target is permitted, the switching hub 40 connects the outside tool 2 and the ECU 20 to be the communication target, so that the outside tool 2 and the ECU 20 to be the communication target enable to perform the Ethernet communication. Accordingly, after permitting the communication, another ECU 20 other than the ECU 20 to be the communication target does not perform the Ethernet communication with the outside tool 2. Even when a certain unauthorized vehicle-outside apparatus is connected to the connector 30, the unauthorized vehicle-outside apparatus does not perform the Ethernet communication with another ECU 20 other than the ECU 20 to be the communication target. Therefore, it may be possible to prevent the unauthorized vehicle-outside apparatus from performing the communication with each ECU 20.

(1B) When the termination of the permitted Ethernet communication is detected (S260: YES), the control signal is output to the switching hub 40 (S270). The control signal instructs the gateway ECU 50 as a connection destination of the outside tool 2. According to the control signal, the gateway ECU 50 is connected to the outside tool 2. Accordingly, after terminating the permitted Ethernet communication, each ECU 20 other than the gateway ECU 50 does not perform the Ethernet communication with the outside tool 2. Therefore, even when a certain unauthorized vehicle-outside apparatus is connected to the connector 30, the unauthorized vehicle-outside apparatus does not perform the Ethernet communication with each ECU 20. It may be possible to prevent the unauthorized vehicle-outside apparatus from performing the communication with each ECU 20.

(1C) According to the termination signal that is transmitted from the ECU 20 to be the communication target by using the CAN communication, that is, according to the communication termination notification, the termination of the Ethernet communication with the outside tool 2 is detected (S260). Even when a case where the Ethernet communication between the outside tool 2 and the ECU 20 to be the communication target is not terminated for a certain reason occurs, it may be possible that the gateway ECU 50 receives the termination signal from the ECU 20 to be the communication target by using the CAN communication, which is different from the Ethernet communication. That is, since the gateway ECU 50 switches a setting of the switching hub 40 so that the outside tool 2 and the gateway ECU 50 are connected on the basis of the termination signal, it may be possible to terminate the Ethernet communication between the outside tool 2 and the ECU 20 to be the communication target.

(1D) When the Ethernet communication between the ECU 20 to be the communication target and the outside tool 2 ends, the ECU 20 to be the communication target transmits the termination signal to the gateway ECU 50 (S390). Accordingly, it may be possible to surely switch the setting of the switching hub 40 after the Ethernet communication with the outside tool 2 ends.

(1E) The ECU 20 to be the communication target determines whether the Ethernet communication with the outside tool 2 is permitted on the basis of the authorization information included in the Ethernet communication frame transmitted from the outside tool 2. When the Ethernet communication with the outside tool 2 is not permitted (S430: NO), the ECU 20 to be the communication target transmits the termination signal (S460, S390). Accordingly, when the outside tool 2 and the ECU 20 to be the communication target are connected with the switching hub 40 so as to perform the Ethernet communication, and when a certain unauthorized vehicle-outside apparatus is connected to the connector 30 instead of the outside tool 2, the ECU 20 to be the communication target transmits the termination signal. Since an Ethernet communication frame transmitted from the unauthorized vehicle-outside apparatus does not include the authorization information, the ECU 20 to be the communication target transmits the termination signal. In this case, the gateway ECU 50 switches the setting of the switching hub 40 on the basis of the termination signal, and it may be possible to end the Ethernet communication with the unauthorized vehicle-outside apparatus. Therefore, it may be possible to prevent the unauthorized vehicle-outside apparatus from performing the communication.

(1F) The Ethernet communication frame transmitted by the outside tool 2 includes function information showing a function of the ECU 20 to be the communication target. The function information includes the connection purpose code as the authorization information. According to this configuration, since a permission determination is executed based on more information, it may be possible to improve determination accuracy, and it may be possible to prevent a communication with the unauthorized apparatus more surely.

(1G) The data communication with the outside tool 2 is performed by the Ethernet communication that has the amount of data communication per unit time greater than the CAN communication. Therefore, it may be possible to shorten a time required for the data communication when a large volume data communication such as a rewriting processing of a program is performed.

Incidentally, in the first embodiment, the gateway ECU 50 corresponds to an example of a relay apparatus. The switching hub 40 corresponds to an example of a connection switch portion. S215 corresponds to an example of processing of a permission determination portion. S250 corresponds to an example of processing of an initiation switch portion. S260 corresponds to an example of processing of a termination detection portion. S270 corresponds to an example of processing of a termination switch portion.

2. Second Embodiment (2-1. Configuration)

Since a second embodiment has a similar configuration of the first embodiment and the configuration of the second embodiment is similar to the configuration in the first embodiment, an explanation in common with the first embodiment will be omitted. A different point will be explained mainly.

In the first embodiment, even when the ignition switch of the subject vehicle is in the OFF status, the onboard system 1 receives the power supply. By contrast, in the second embodiment illustrated in FIG. 14, even when the ignition switch of the vehicle is in the off status, a part of the gateway apparatus 10 and a part of each ECU 20 receive power supply. Hereinafter, a status where a part of the gateway apparatus 10 and a part of each ECU 20 receive power supply is designated as a sleep status.

Figure 14:
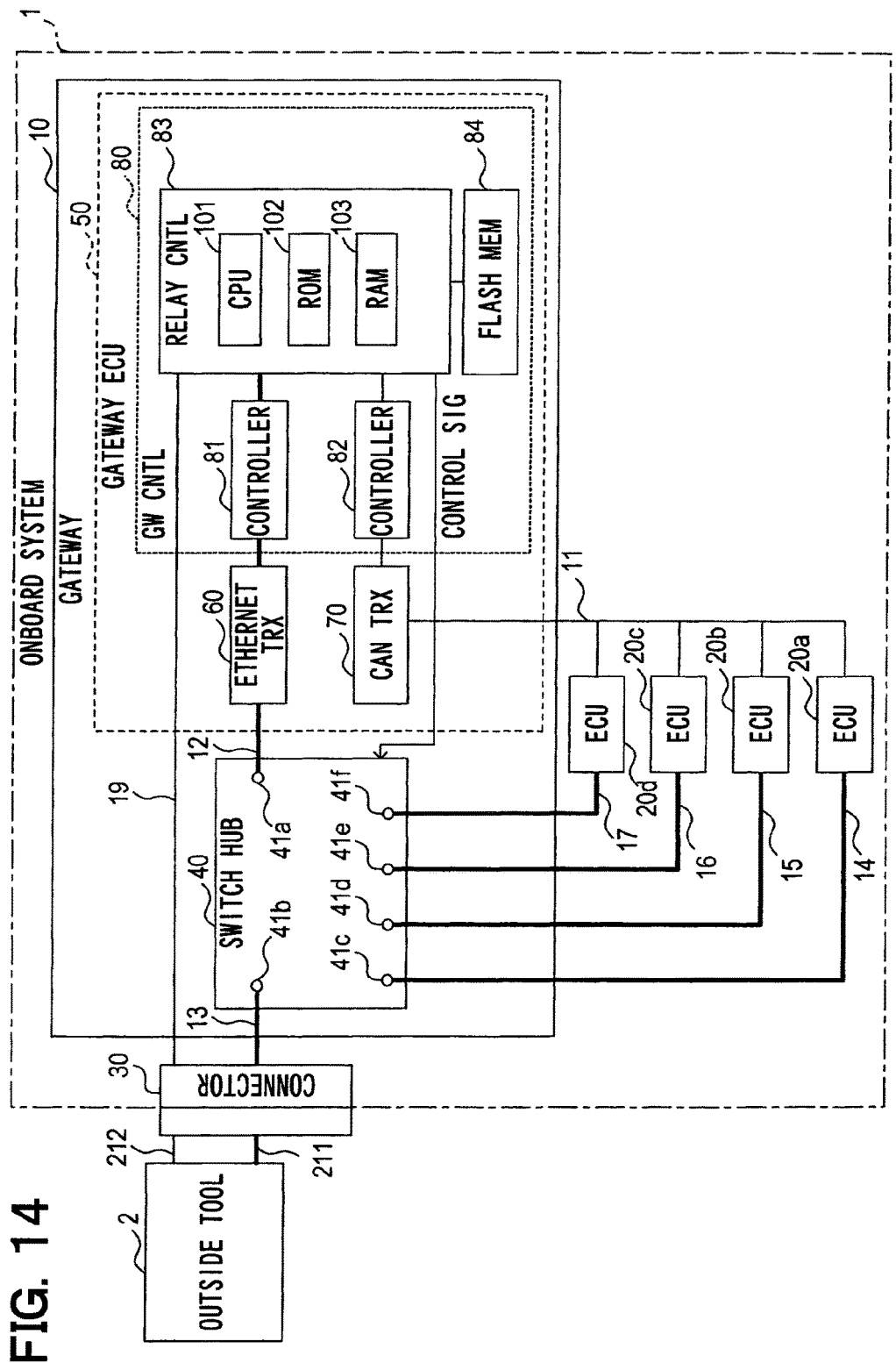
FIG. 14 is a block diagram illustrating a communication system and an onboard system in a second embodiment.

As described in FIG. 14, the outside tool 2 outputs a wakeup signal and a sleep signal through a connection line (an activation line) 212 that is different from the connection line 211 for the Ethernet communication. In the second embodiment, a signal having a high level status outputted to the activation line is defined as the wakeup signal, and a signal having a high level state is defined as the sleep signal, for example.

Even when the ignition switch of the vehicle is in the off status, the onboard system 1 supplies the switching hub 40 and a part of the gateway ECU 50 with the electric power. Incidentally, a part of the gateway ECU 50 includes the Ethernet transceiver 60, the Ethernet controller 81, the relay control portion 83, and the flash memory 84. The relay control portion 83 of the gateway ECU 50 receives the wakeup signal outputted from the outside tool 2 through the connector 30 and a communication line 19.

Figure 15:
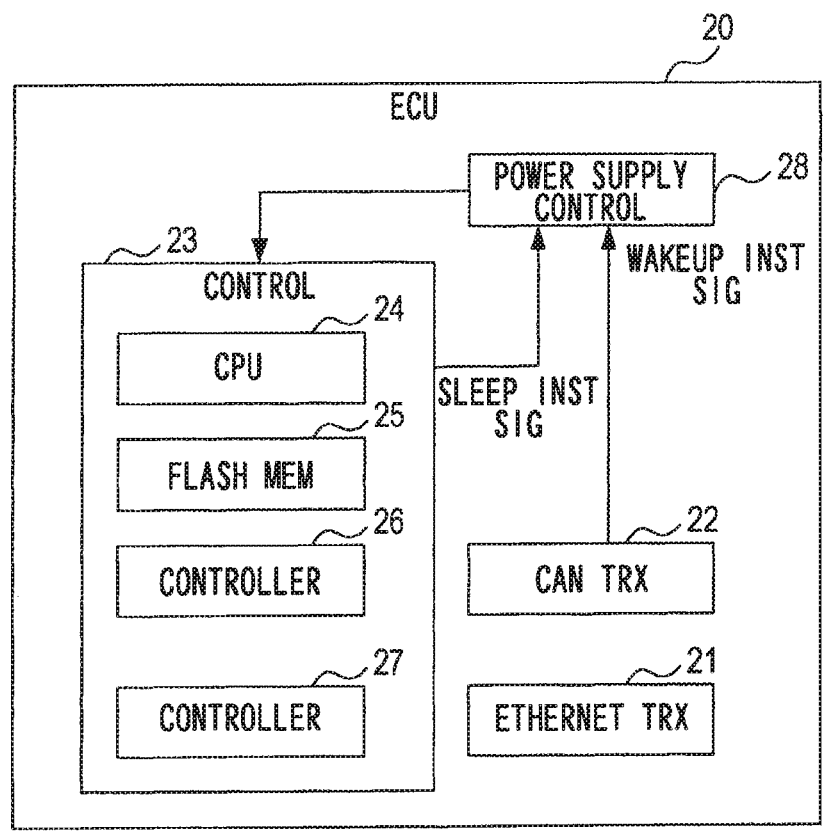
FIG. 15 is a block diagram illustrating a configuration of an ECU.

As described in FIG. 15, the ECU 20 in the second embodiment further includes a power supply control portion 28, as compared with the configuration of FIG. 3A. The power supply control portion 28 controls electric supply to the control portion 23. When the power supply control portion 28 receives a wakeup instruction signal, the power supply control portion 28 supplies the control portion 23 with electric power. When receiving a sleep instruction signal, the power supply control portion 28 stops the supply of the electric power to the control portion 23. The CAN transceiver 22 outputs the wakeup instruction signal. The control portion 23 outputs the sleep instruction signal. Even when the ignition switch of the vehicle is in the off status, the ECU 20 supplies the CAN transceiver 22 and the power supply controller 28 with electric power.

(2-2. Processing)

Processing (a communication method) executed by the communication system in the present embodiment will be explained.

(2-2-1. Processing by Outside Tool)

Figure 16:
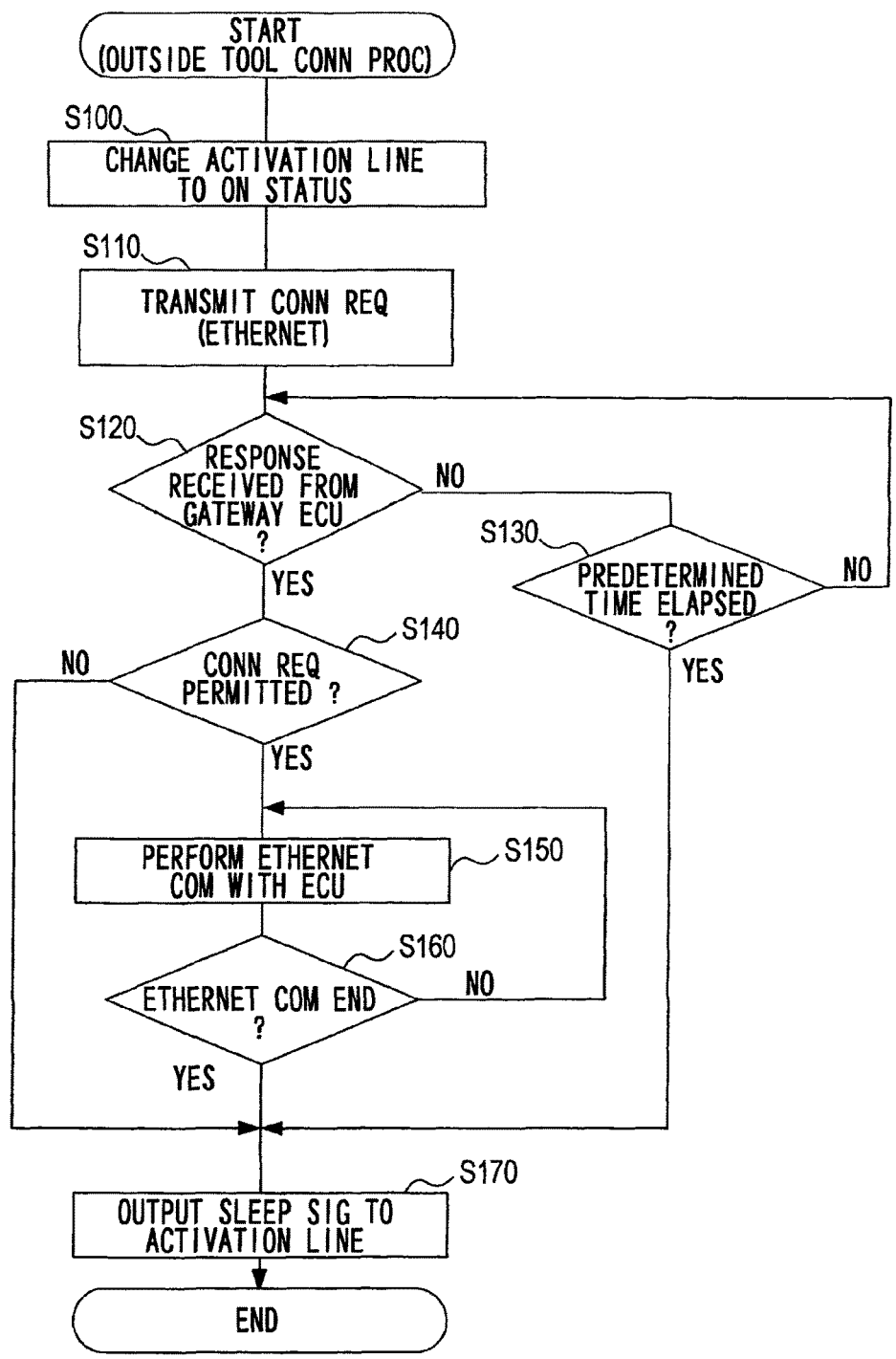
FIG. 16 is a flowchart of the outside tool connection processing.

The outside tool connection processing will be explained with referring to a flowchart in FIG. 16. The control portion 202 in the outside tool 2 performs the outside tool connection processing.

The CPU 203 outputs the wakeup signal to the activation line 212 (S100). After S100, regarding S110-S160, processing similar to FIG. 4 is performed.

At S170, the CPU 203 outputs the sleep signal to the activation line 212, and the outside tool connection process ends.

(2-2-2. Processing by Gateway ECU)

Figure 17:
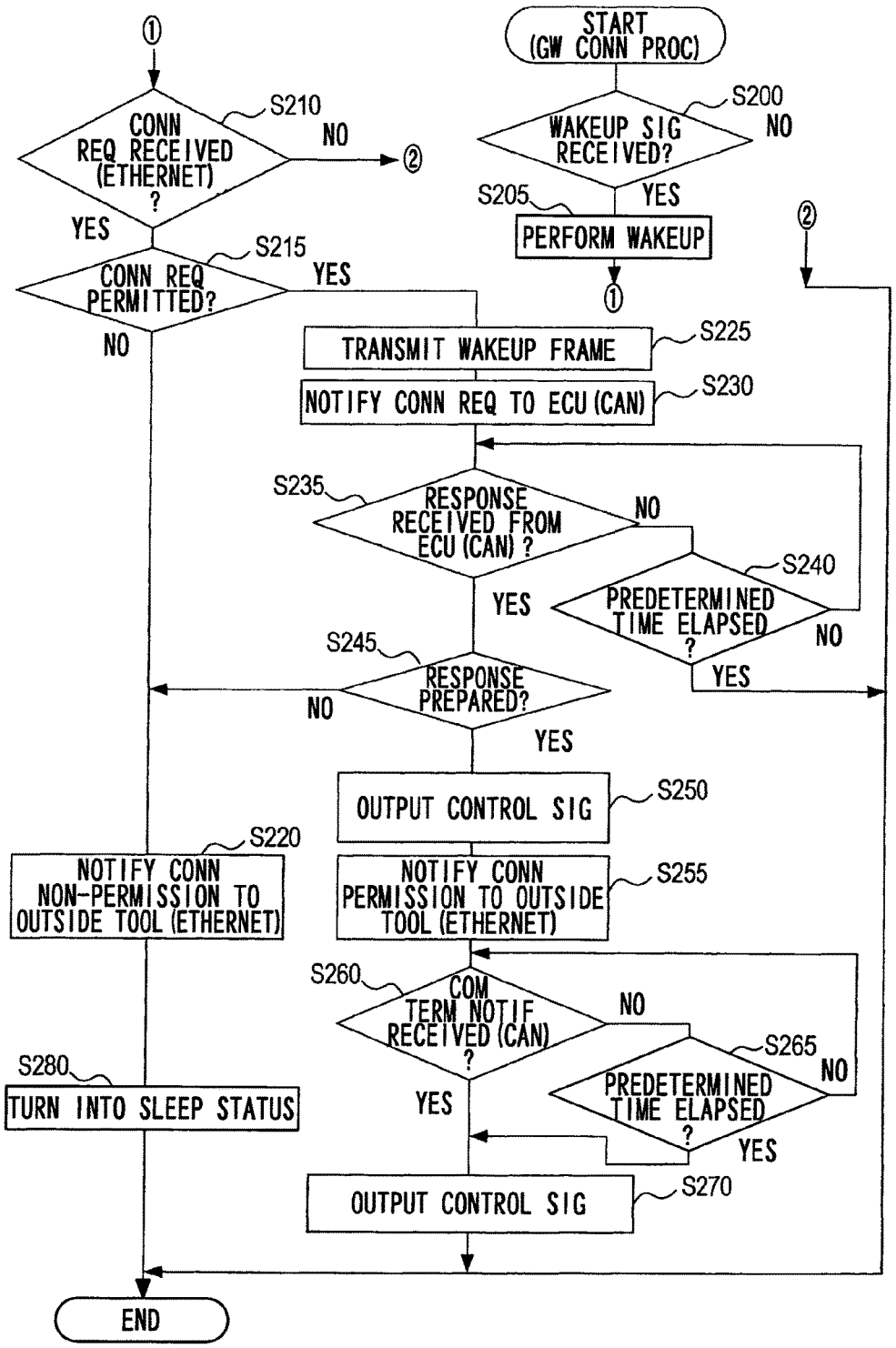
FIG. 17 is a flowchart of a gateway connection processing.

The relay control portion 83 (the CPU 101) in the gateway ECU 50 in the present embodiment executes a GW connection processing. The GW connection processing in the present embodiment will be explained with referring to a flowchart in FIG. 17.

The relay control portion 83 determines whether the relay control portion 83 receives the wakeup signal from the outside tool 2 (S200). When the relay control portion 83 receives the wakeup signal, the relay control portion 83 shifts the processing to S205. When the relay control portion 83 does not receive the wakeup signal, the relay control portion 83 shifts the processing to S280.

At S205, the relay control portion 83 supplies electric power to all components of the gateway ECU 50, and starts up (wakes up) the gateway ECU 50, which is in the sleep status. Regarding S210-S215, the relay control portion 83 executes processing similar to processing in FIG. 7.

At S215 to which the processing shifts when the connection request, from the outside tool 2, with the ECU 20 to be the communication target is permitted, the relay control portion 83 transmits the CAN communication frame (a wakeup frame) by using the CAN communication. The CAN communication causes to wake up the ECU 20 to be the communication target. Regarding S220 and S230-S270, the CPU 203 executes processing similar to the processing of FIG. 7.

At S280, the relay control portion 83 causes the gateway ECU 50 to be the sleep status, and ends the GW connection process.

(2-2-3. Processing by ECU)

Figure 18:
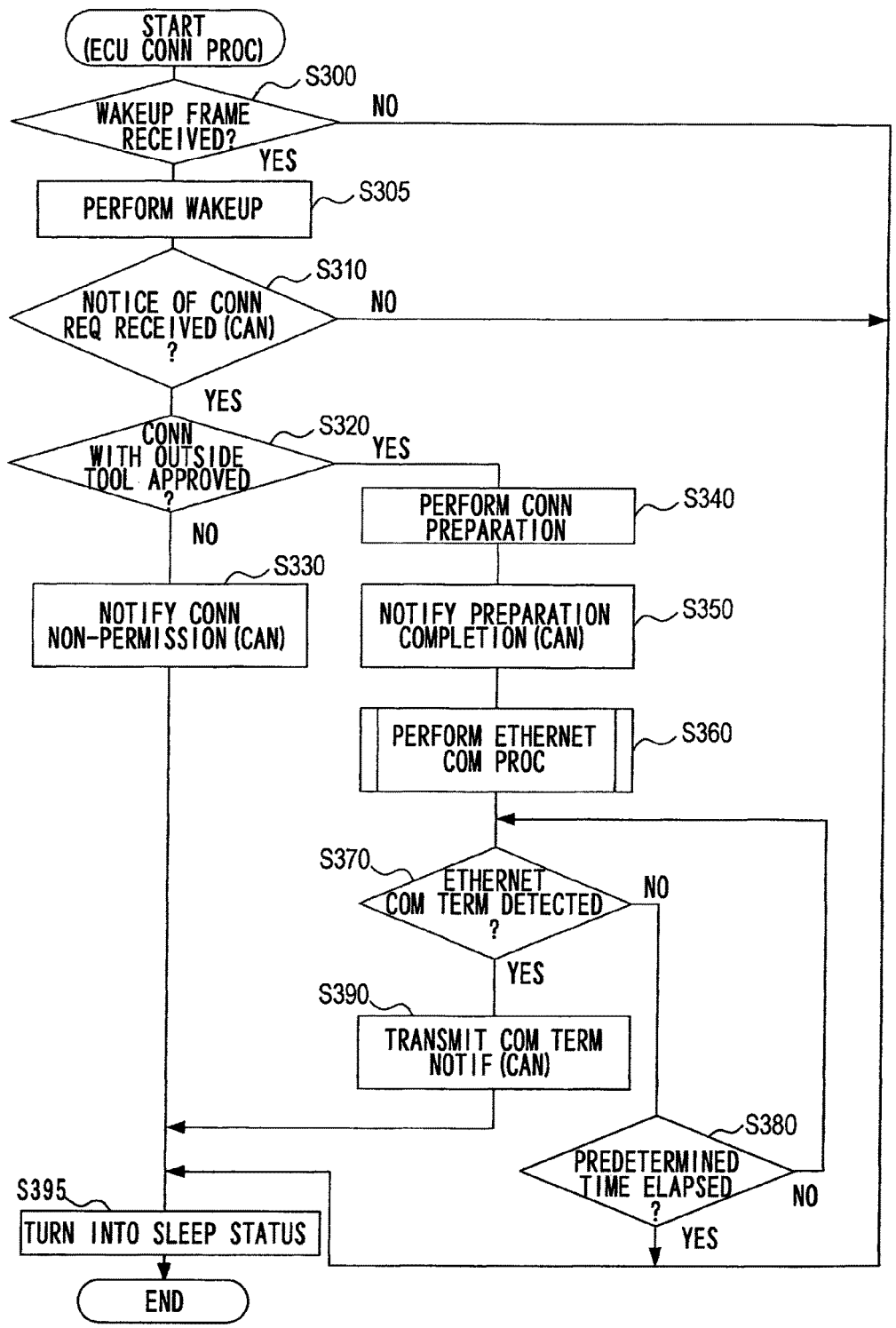
FIG. 18 is a flowchart of ECU connection processing.

The control portion 23 (the CPU 24) in each ECU 20 in the present embodiment executes the ECU connection processing. The ECU connection processing in the present embodiment will be explained with referring to the flowchart in FIG. 18.

The CPU 24 determines whether the CPU 24 receives the wakeup frame from the gateway ECU 50 (S300). When the CPU 24 receives the wakeup frame, the CPU 24 shifts the processing to S305. When the CPU 24 does not receive the wakeup frame, the CPU 24 shifts the processing to S395. Regarding S310-S390, the CPU 24 executes the processing similar to the processing in FIG. 10.

At S305, the CPU 24 supplies electric power to all components of the ECU 20, and starts up (wakes up) the ECU 20, which is in the sleep status.

At S395, the CPU 24 causes the ECU 20 to be the sleep status, and ends the ECU connection process.

(2-3. Operation)

Figure 19:
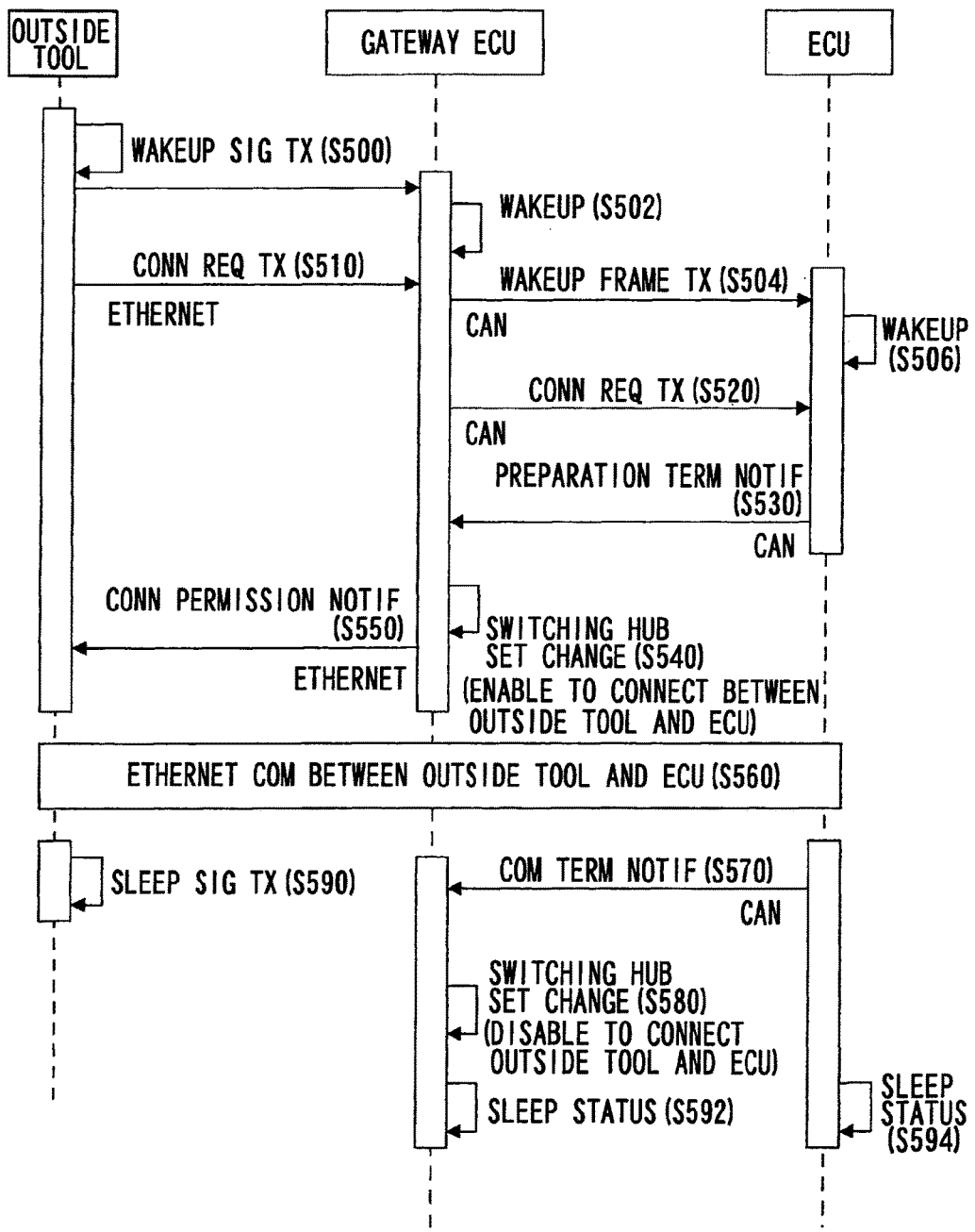
FIG. 19 is a diagram illustrating an example of a sequence when a connection between the outside tool and an ECU is permitted.

An operation of the onboard system 1 in the present embodiment will be explained with referring to sequences in FIG. 19. FIG. 19 is a diagram illustrating an example of a sequence when a connection between the outside tool 2 and the ECU 20 to be the communication target is permitted.

The outside tool 2 outputs the wakeup signal to the activation line 212 (S500).

When the gateway ECU 50 (the relay control portion 83) receives the wakeup signal, the gateway ECU 50 wakeups the gateway ECU 50 (S502).

The outside tool 2 transmits the connection request with the ECU 20 to be the communication target by using the Ethernet communication (S510).

When permitting the connection request between the outside tool 2 and the ECU 20 to be the communication target (S215: YES), the gateway ECU 50 transmits the wakeup frame to the ECU 20 to be the communication target.

The ECU 20 to be the communication target that has received the wakeup frame wakeups the ECU 20 itself (S506).

After S506, regarding S520-S580, processing similar to FIG. 12 is performed.

At S590 after terminating the Ethernet communication with the ECU 20 to be the communication target, the outside tool 2 outputs the sleep signal to the activation line 212.

At S592 after outputting the control signal that sets the grouping of the port 41 in the switching hub 40, the gateway ECU 50 (the relay control portion 83) causes the gateway ECU 50 to be in the sleep status.

At S594 after transmitting the communication termination notification to the gateway ECU 50 by using the CAN communication, the ECU 20 to be the communication target causes the ECU 20 itself to be the communication target to be in the sleep status.

(2-4. Effect)

According to the second embodiment, in addition to the effects (1A)-(1G) of the first embodiment, the following effect (2A) is obtained.

(2A) The gateway ECU 50 enables to wake up from the sleep status according to the wakeup signal transmitted from the outside tool 2 (S205). When the gateway ECU 50 is waked up according to the wakeup signal, the gateway ECU 50 enables to wake up the ECU 20 to be the communication target that is in the sleep status by using the CAN communication (S225). Accordingly, it may be possible to reduce power consumption of the onboard system 1.

Incidentally, S205 may correspond to an example of processing of a wakeup portion. S225 may correspond to an example of processing of a target wakeup portion.

3. Another Embodiment

The embodiments of the present disclosure have been described. However, it should be noted that the present disclosure is not limited to the present embodiment, and the present disclosure may have various modes.

(3A) In the above embodiments, the relay control portion 83 determines whether the connection request with the ECU 20 to be the communication target transmitted from the outside tool 2 is permitted, on the basis of the predetermined authorization information. The predetermined authorization information is included in the data part of the Ethernet communication frame received from the outside tool 2. Specifically, the authorization information includes the authorization code, the connection purpose code, and the correspondence relation of them. It should be noted that the authorization information is not limited to this embodiment. The relay control portion 83 may determine whether the connection request is permitted on the basis of various information included in the data part of the Ethernet communication frame, which the outside tool 2 has transmitted. For example, the relay control portion 83 may determine whether the connection request is permitted on the basis of either one of the authorization code and the connection purpose code. The relay control portion 83 may determine whether the connection request is permitted on the basis of the transmission source MAC address included in the header part of the Ethernet communication frame, which the outside tool 2 has transmitted. The relay control portion 83 may determine whether the connection request is permitted on the basis of an Internet protocol (IP) address included in the Ethernet communication frame, which the outside tool 2 has transmitted.

(3B) In the above embodiment, the outside tool 2 performs a program rewrite by the Ethernet communication between the outside tool 2 and the ECU 20 to be the communication target. The outside tool 2 may rewrite a program by using the Ethernet communication with the gateway ECU 50.

(3C) In the above embodiments, when the connection request connecting the outside tool 2 and the ECU 20 to be the communication target is permitted, the relay control portion 83 outputs the control signal to the switching hub 40, so that the outside tool 2 and the ECU 20 to be the communication target enable to perform the data communication. For example, when the connection request connecting the outside tool 2 and the ECU 20 to be the communication target is permitted, the relay control portion 83 may output the control signal to the switching hub 40, so that only the outside tool 2, the ECU 20, and the gateway ECU 50 enable to perform the data communication.

(3D) The gateway ECU 50 may include the switching hub 40.

(3E) A function included in a single configuration element may be distributed to multiple configuration elements, and functions included in multiple configuration elements may be unified to a single configuration element. At least a part of the configuration in the embodiments may be replaced to a known configuration having the identical function. A part of the configuration in the embodiments may be omitted as long as within a scope of the present disclosure. At least a part of the configuration in one embodiment may be added or replaced to the configuration in another embodiment.

(3F) The present disclosure may be provided by various modes such as an onboard system 1, a GW apparatus 10, a gateway ECU 50, a program for operating the gateway ECU 50, a medium storing the program, a communication method.

Incidentally, the Ethernet communication protocol corresponds to an example of a first communication protocol, the CAN communication protocol corresponds to an example of a second communication protocol, the outside tool 2 or the vehicle-outside apparatus correspond to an example of a first communication apparatus, the ECU 20 corresponds to an example of a second communication apparatus, the Ethernet communication frame corresponds to an example of a first communication frame, and the CAN communication frame corresponds to an example of a second communication frame.

It is noted that a flowchart or a processing of the flowchart in the present application includes steps (also referred to as sections), each of which is represented, for example, as S110. Further, each step may be divided into several sub-steps, and several steps may be combined into a single step.

While the relay apparatus has been described with reference to embodiments thereof, it is to be understood that the disclosure is not limited to the present embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A relay apparatus provided to a vehicle, performing first data communication with a first communication apparatus arranged outside the vehicle, and performing at least second data communication with a plurality of second communication apparatuses provided to the vehicle, the first communication apparatus performing the first data communication, and the plurality of second communication apparatuses performing the first data communication and the second data communication, the relay apparatus comprising:
    a permission determination portion determining whether first data communication between the first communication apparatus and a target second communication apparatus is permitted on a basis of predetermined authorization information included in a first communication frame used in a first communication protocol, wherein the permission determination portion receives the first communication frame from the first communication apparatus through a connection switch portion, the connection switch portion is connected with the first communication apparatus and the plurality of second communication apparatuses and determines a connection destination according to a control signal, and the connection destination performs the first data communication with the first communication apparatus; and
    an initiation switch portion outputting to the connection switch portion, the control signal designating the target second communication apparatus as the connection destination of the first communication apparatus when the permission determination portion permits the first data communication between the first communication apparatus and the target second communication apparatus,
    wherein:
    the first data communication is performed according to the first communication protocol;
    the second data communication is performed according to a second communication protocol;
    the plurality of second communication apparatuses include the target second communication apparatus;
    the plurality of second communication apparatuses perform the second data communication using a common communication channel in common with the plurality of second communication apparatuses; and
    a total amount of the first data communication per unit time is greater than a total amount of the second data communication per unit time.

2. The relay apparatus according to claim 1, further comprising:
    a termination detection portion detecting a termination of the first data communication, which is permitted by the permission determination portion; and
    a termination switch portion outputting to the connection switch portion, the control signal designating the relay apparatus as the connection destination of the first communication apparatus when the termination detection portion detects the termination of the first data communication.

3. The relay apparatus according to claim 2, wherein:
the termination detection portion detects the termination of the first data communication on a basis of a termination signal that the target second communication apparatus transmits by using the second data communication.

4. The relay apparatus according to claim 3, wherein:
when the first data communication between the target second communication apparatus and the first communication apparatus is terminated, the termination detection portion receives the termination signal from the target second communication apparatus.

5. The relay apparatus according to claim 3, wherein:
the termination detection portion receives the termination signal from the target second communication apparatus when the target second communication apparatus determines whether the target second communication apparatus permits the first data communication with the first communication apparatus on a basis of the authorization information, and when the target second communication apparatus does not permit the first data communication with the first communication apparatus; and
the first communication frame transmitted from the first communication apparatus includes the authorization information.

6. The relay apparatus according to claim 1, wherein:
the first communication frame transmitted from the first communication apparatus includes, as the authorization information, function information that shows a function of the target second communication apparatus.

7. The relay apparatus according to claim 1, further comprising:
a wakeup portion waking up according to a wakeup signal that is transmitted from the first communication apparatus; and
a target wakeup portion, by the second data communication, waking up the target second communication apparatus that is in a sleep status, when the relay apparatus wakes up.

8. The relay apparatus according to claim 1, wherein:
the first data communication includes Ethernet communication.

9. A relay system comprising:
a relay apparatus provided to a vehicle, performing first data communication with a first communication apparatus arranged outside the vehicle, and performing at least second data communication with a plurality of second communication apparatuses provided to the vehicle, the first communication apparatus performing the first data communication, and the plurality of second communication apparatuses performing the first data communication and the second data communication; and
a connection switch portion that is connected with the first communication apparatus and the plurality of second communication apparatuses and determines a connection destination according to a control signal, wherein the connection destination performs the first data communication with the first communication apparatus,
wherein:
the relay apparatus includes:
  a permission determination portion determining whether first data communication between the first communication apparatus and a target second communication apparatus is permitted on a basis of predetermined authorization information included in a first communication frame used in a first communication protocol, the permission determination portion receiving, through the connection switch portion, the first communication frame from the first communication apparatus, and
  an initiation switch portion outputting to the connection switch portion, the control signal designating the target second communication apparatus as the connection destination of the first communication apparatus when the permission determination portion permits the first data communication between the first communication apparatus and the target second communication apparatus;
the first data communication is performed according to the first communication protocol;
the second data communication is performed according to a second communication protocol;
the plurality of second communication apparatuses include the target second communication apparatus;
the plurality of second communication apparatuses perform the second data communication using a common communication channel in common with the plurality of second communication apparatuses; and
a total amount of the first data communication per unit time is greater than a total amount of the second data communication per unit time.

10. The relay apparatus according to claim 9, further comprising:
a termination detection portion detecting a termination of the first data communication, which is permitted by the permission determination portion.

11. The relay apparatus according to claim 10, further comprising:
a termination switch portion outputting to the connection switch portion, the control signal designating the relay apparatus as the connection destination of the first communication apparatus when the termination detection portion detects the termination of the first data communication.

* * * * *